(12) United States Patent
Brazier

(10) Patent No.: US 7,900,723 B2
(45) Date of Patent: Mar. 8, 2011

(54) MOTORIZED SNOWBOARD

(76) Inventor: Glen Brazier, Karlstad, MN (US)

( * ) Notice: Subject to any disclaimer, the term of this patent is extended or adjusted under 35 U.S.C. 154(b) by 114 days.

(21) Appl. No.: 12/378,370

(22) Filed: Feb. 13, 2009

(65) Prior Publication Data
US 2009/0152037 A1    Jun. 18, 2009

Related U.S. Application Data

(63) Continuation-in-part of application No. 12/002,840, filed on Dec. 19, 2007, now Pat. No. 7,686,109, which is a continuation-in-part of application No. 11/652,455, filed on Jan. 11, 2007, now Pat. No. 7,784,571, and a continuation-in-part of application No. 29/271,188, filed on Jan. 11, 2007, now Pat. No. Des. 567,712.

(51) Int. Cl.
*B62D 11/00* (2006.01)
(52) U.S. Cl. .......................... 180/9.44; 305/44
(58) Field of Classification Search .................. 180/9.1, 180/9.44, 9.46; 305/157–184, 44
See application file for complete search history.

(56) References Cited

U.S. PATENT DOCUMENTS

| | | | |
|---|---|---|---|
| 3,548,962 A | 12/1970 | Best | |
| 3,794,131 A | 2/1974 | Freedman | |
| 3,934,664 A | 1/1976 | Pohjola | |
| 4,046,429 A * | 9/1977 | Pohjola | 305/159 |
| 4,119,356 A | 10/1978 | Pohjola | |
| 4,129,990 A | 12/1978 | Valantin | |
| 4,143,728 A | 3/1979 | Shiber | |
| 4,188,076 A | 2/1980 | Pohjola | |
| 4,232,911 A | 11/1980 | Valantin | |
| 4,307,788 A | 12/1981 | Shelton | |
| 4,534,437 A | 8/1985 | Howerton | |
| 4,714,125 A | 12/1987 | Stacy, Jr. | |
| 4,828,339 A | 5/1989 | Thomas et al. | |
| 4,984,648 A | 1/1991 | Strzok | |
| 5,127,488 A | 7/1992 | Shanahan | |
| 5,305,846 A | 4/1994 | Martin | |
| 5,662,186 A | 9/1997 | Welch | |
| 6,193,003 B1 | 2/2001 | Dempster | |
| 6,435,290 B1 | 8/2002 | Justus | |
| 6,698,540 B1 | 3/2004 | Decker | |

* cited by examiner

*Primary Examiner* — Kevin Hurley
(74) *Attorney, Agent, or Firm* — DL Tschida

(57) ABSTRACT

A gasoline engine powered snowboard having an endless track trained about a support frame containing driven and idler wheels. Engine operation is directed from an upright operator support column. A molded chassis is hinge coupled to pivot about alternative contoured track support pan assemblies. The pan support assemblies cooperate with flexible track surfaces (e.g. fringe or pleat members) and foot supports to enable steering with foot and body movements. A lower support pan exhibits convex edge surfaces that contact track pleats or fringe pieces and includes an elliptic longitudinal channel. Alternative upper support pans provide a reciprocating wheeled steering plate, longitudinal drive lug channels and contoured snow diversion surfaces and/or an agitator. Internal track surfaces include UHMW pieces at or aligned to the drive lugs. Ground contact lugs exhibit traction promoting and snow clearing contoured profiles, shapes and recesses.

24 Claims, 33 Drawing Sheets

MOTORIZED SNOWBOARD

RELATED APPLICATION DATA

This is a continuation-in-part of application Ser. No. 12/002,840, filed Dec. 19, 2007 now U.S. Pat. No. 7,686,109, which is a continuation-in-part of application Ser. No. 11/652,455 filed Jan. 11, 2007, now U.S. Pat. No. 7,784,571 and application Ser. No. 29/271,188 filed Jan. 11, 2007, now D567,712.

BACKGROUND OF THE INVENTION

The present invention relates to a powered snowboard assembly and, in particular, to a gas engine powered snowboard having an endless track with flexible lateral, peripheral edges (e.g. slots or pleats) supported to rotate about a frame assembly in contact with an interchangeable chassis support pan. A recess in the pan and associated flanges, rails, beveled surfaces and/or a wheeled slider assembly promote track flexion and steering in response to weight adjustments placed on foot control surfaces.

A wide variety of engine powered, personal transport vehicles have been developed for recreational travel over land, water and snow. Some dry land skateboard type vehicles that accommodate a standing operator are shown at U.S. Pat. Nos. 6,435,290; 5,127,488; and 4,143,728. Some snow based vehicles that accommodate seated operators are shown at U.S. Pat. Nos. 4,534,437 and 3,794,131. Several track supported snow vehicles that accommodate standing operators are shown at U.S. Pat. Nos. 6,698,540; 6,193,003; 5,662,186; 5,305,846; 4,984,648; and 4,307,788.

Different types of downhill snowboards and related improvements have also been developed to satisfy the ever changing human desire for challenging recreational devices. The U.S. Pat. No. 5,662,186 is directed to a powered snowboard having multi-section operator and engine platforms that align at different inclinations. The vehicle however is not particularly adapted to mimic the operating experience of a conventional un-powered snowboard.

The present invention was developed to provide a motorized snowboard with the agility of a non-motorized snowboard. The device supports a standing operator and, except for engine operation, is controlled and steered with foot movements that substantially mimic the experience of riding a conventional snowboard. Use of the subject snowboard is however not limited to steep or hilly terrain. Instead, the snowboard can be used over moderate hills and undulating or flat terrains to provide an operator a more athletic experience than merely riding a snowmobile. The snowboard is also configured to be user friendly to facilitate access to the track with a hinged chassis assembly. Upper and lower track support pans having judiciously arranged contour curvatures minimize snow and ice build-up in the spaces between the track and chassis and between the track and support pans and optimize steering control.

SUMMARY OF THE INVENTION

It is a primary object of the invention to provide an engine powered vehicle that can be steered with foot and/or body movements.

It is further object of the invention to provide an endless track vehicle that can be operated by an upright operator over a variety of surfaces (e.g. snow, ice, hard pack, sand etc.).

It is further object of the invention to provide an endless track vehicle having an upright hand hold, control column.

It is an object of the invention to provide a vehicle with a support frame having a drive sprocket and a plurality of idler wheels that cooperate with an engine to drive a flexible track mounted to a surrounding chassis.

It is further object of the invention to provide a vehicle with an operator directed cable-type or electromechanical control linkage to the engine, control surfaces or other equipment assemblies.

It is further object of the invention to provide a track having a plurality of slits, pleats or other flexible or resilient surfaces that define resilient track regions that flex, expand and/or contract to accommodate body-shifting movements to steer the vehicle.

It is further object of the invention to provide a track having transverse fringe pieces that support flexible ground contacting lugs.

It is further object of the invention to provide a track having pleats that transversely extend from peripheral track edges to enable track flexion and promote steering.

It is further object of the invention to provide a track having rows of transversely extending lugs that depend from a central track portion and adjoining, laterally staggered, flexibly resilient track sections containing steering lugs and wherein the flexible track sections flex and cooperate with contoured chassis support surfaces to promote steering.

It is further object of the invention to provide ground contact steering lugs at flexibly resilient track surfaces that exhibit raised isosceles triangular-shaped surfaces and that transversely extend at obtuse angles from interconnected lugs depending from the center portion of the track.

It is further object of the invention to provide a track having stiffener and/or wear rods with formed sections contoured to the track and molded into the track to reduce track friction at contact surfaces with a track support assembly.

It is further object of the invention to provide a track having ultra high molecular weight (UHMW) stiffener rods or other performance enhancing devices thermo formed to desired shapes and/or bonded to or molded contemporaneously with the forming of steering lugs or other track surfaces.

It is further object of the invention to provide an interchangeable, contoured track support pan at the bottom of the chassis that cooperates with drive and steering lugs and flexible track surfaces to steer the vehicle with operator foot and body movements.

It is further object of the invention to provide a track support pan assembly with beveled track engaging surface(s), drive lug receiving recess(es), rail(s) and/or other mechanisms to prevent track dislodgement and promote flexion at adjoining flexible track steering surfaces.

It is further object of the invention to provide a track support assembly including a lower pan with a beveled, inverted V-shaped reciprocating slide plate with domed track engaging wheels that selectively direct and/or flex the track to promote steering.

It is further object of the invention to provide a track support pan having a central, elongated, ovular recessed channel exhibiting longitudinal and transverse concave curvatures and transverse convex curvatures along longitudinal surfaces adjoining the channel.

It is further object of the invention to couple a reciprocating track flexing assembly mounted to a support pan with spherical couplers to enhance reciprocating steering movements.

It is further object of the invention to provide a track having ultra high molecular weight (UHMW) caps, plugs or other slippery, wear resistant devices mounted and/or formed into the drive and/or steering lugs.

It is further object of the invention to provide a track support with a snow and ice diverting assembly.

It is further object of the invention to provide snow relieving surfaces at the endless track that cooperate with a snow and ice diverter shield or support pan.

It is further object of the invention to provide a plastic track support or diverter pan exhibiting compound curvatures at fore and aft end corners to minimize snow and ice build up between the track and support pans.

It is further object of the invention to provide a track assembly with snow and ice agitating and exhaust means to discharge ice and snow from within the track assembly.

The foregoing objects, advantages and distinctions of the invention are obtained in alternative track frame assemblies having dedicated or interchangeable track support pans. In one construction, the snowboard comprises an endless track trained about a track support frame containing driven and idler or "bogie" wheels. The track support frame is mounted to a molded chassis having forward and rear foot supports. A gasoline engine mounts to the chassis and a drive linkage couples the engine to the track support frame and depending endless track. Engine drive power is transferred via a clutch and interconnected chain/belt drive linkages to a drive shaft that supports a track drive sprocket and idler shafts that support drive wheels that engage an interior surface of the track.

Engine operation is directed from an operator's column and cabling and/or electro-mechanical servos coupled to the engine. The bottom surface of the chassis provides a chassis or track support pan assembly that in one version includes a longitudinal recess and contoured surfaces that engage flexible portions of the track to directionally promote track movements to steer the vehicle in response to weight shifting movements at the foot control surfaces.

Drive lugs project from the interior track surface, follow the longitudinal recess and engage the drive and idler sprockets. Peripheral edge portions of the track follow shaped contours of the chassis support pan. The support pan can exhibit bevels and/or valleys, recesses, cutouts and/or other surface shapes that flex the track to directionally promote track movement or flexion in cooperative response to operator or other induced movements. Idler wheels depending from a chassis cover piece follow one or more channels between ground engaging lugs and control lateral movement of the track at the track support pan assembly. The support pan can also support and/or cooperate with assemblies that selectively engage and/or direct flexible steering portions of the track.

The track is presently divided into a center portion containing upright interior drive lugs and flexible fringe or pleated portions. The center portion exhibits a relatively narrow width (e.g. less than one-third the overall track width) and from which the drive lugs project in rows and pass between opposed longitudinal arcuate sidewalls (e.g. ovular) of a longitudinal recess at the support pan. Lateral movement of the track is limited by contact between the drive lugs and the recessed side walls of the support pan. Adjoining surfaces of the flexible fringe or pleated track portions contact beveled surfaces at the support pan to promote steering.

The ground engaging lugs exhibit contoured thickness profiles and define idler wheel channels. Depending forward and trailing surfaces taper to a ridged apex. The lateral extension of the forward and trailing lug surfaces define a straight central portion and end portions that obtusely radiate relative to the central portion. Collectively, the lugs direct forward track movement as rows of depending ground contacting lugs at filamentary fringe or pleated portions of the track flex with operator movements as the fringe or pleated portions follow the contoured support pan to directionally promote steering movements.

Ground contact surfaces of the flexible fringe or pleated track portions contain rows of laterally depending steering lugs. The flexible track portions are defined by seriatim, slots or gaps that form fringe pieces or seriatim flexible pleats defined at flexible track surfaces. The fringe and flexible track surfaces support rows of ground engaging steering lugs. The region of ground contact of the steering lugs of each fringe or flexible track piece transversely overlaps the span of steering lugs depending from adjoining fringe pieces or between pleats.

An alternative vehicle assembly provides a track with flexible pleats located along peripheral track edges. The pleats cooperate with an interchangeable chassis/track support pan that can contain a reciprocating steering plate having a number of wheels that contact the drive lugs to shift the pleats into contact with beveled surfaces at the support pan. The steering plate is supported from spherical couplers and mounted to accommodate reciprocating lateral movement. Formed axles at the wheels permit independent tilting movement at the wheels to enhance control over wheel-to-drive lug contact and track flexion.

UHMW plastic stiffener rods are molded into the track in parallel co-axial alignment with the steering lugs. The rods are fitted to the track during lay-up and bent during molding to align with desired track surfaces. In one track construction openings or pockets are formed into the steering lugs as the rods are bent to shape. The rods are located and formed to reduce friction and improve the wear resistance of the track with support pan contact.

Other improvements include UHMW plastic caps and/or plugs or other devices that are molded or mounted into the track lugs to reduce friction with support pan contact and improve the wear resistance and steering control of the track. Apertures are provided in the track to relieve and/or prevent collection of snow and ice in the chassis and enhance track flexion. A shield or snow diverter is provided to prevent buildup of snow and ice at the track flexion/steering wheels. Snow and ice agitators and an exhaust assembly cooperate with the shield to remove snow from beneath the chassis and track assembly.

A further improved chassis and track support assembly is disclosed that provides a hinged support adapted to extend between right and left slide pan rails and a chassis to cover piece to permit a clam shell pivoting of the cover piece for inspection of the track and track support pan assembly and/or vehicle maintenance. An improved lower track support pan provides a longitudinal, ovular track containment channel that exhibits longitudinal and transverse concave contours relative to the ground. Longitudinal peripheral pan edges exhibit a convex transverse curvature relative to the ground. An upper plastic snow and ice diverter pan exhibits compound curvatures at fore and aft end corner surfaces to direct and divert snow and ice rearward and outward from the space between the upper pan and track.

Still other objects, advantages, distinctions, constructions and combinations of individual features of the invention will become more apparent from the following description with respect to the appended drawings. Similar components and assemblies are referred to in the various drawings with similar alphanumeric reference characters. The description to each combination should therefore not be literally construed in limitation of the invention. It is also to be appreciated the singular improvements can be combined in any variety of track assemblies. The invention should therefore be interpreted within the broad scope of the further appended claims.

DESCRIPTION OF THE PREFERRED EMBODIMENTS

Figure 1:
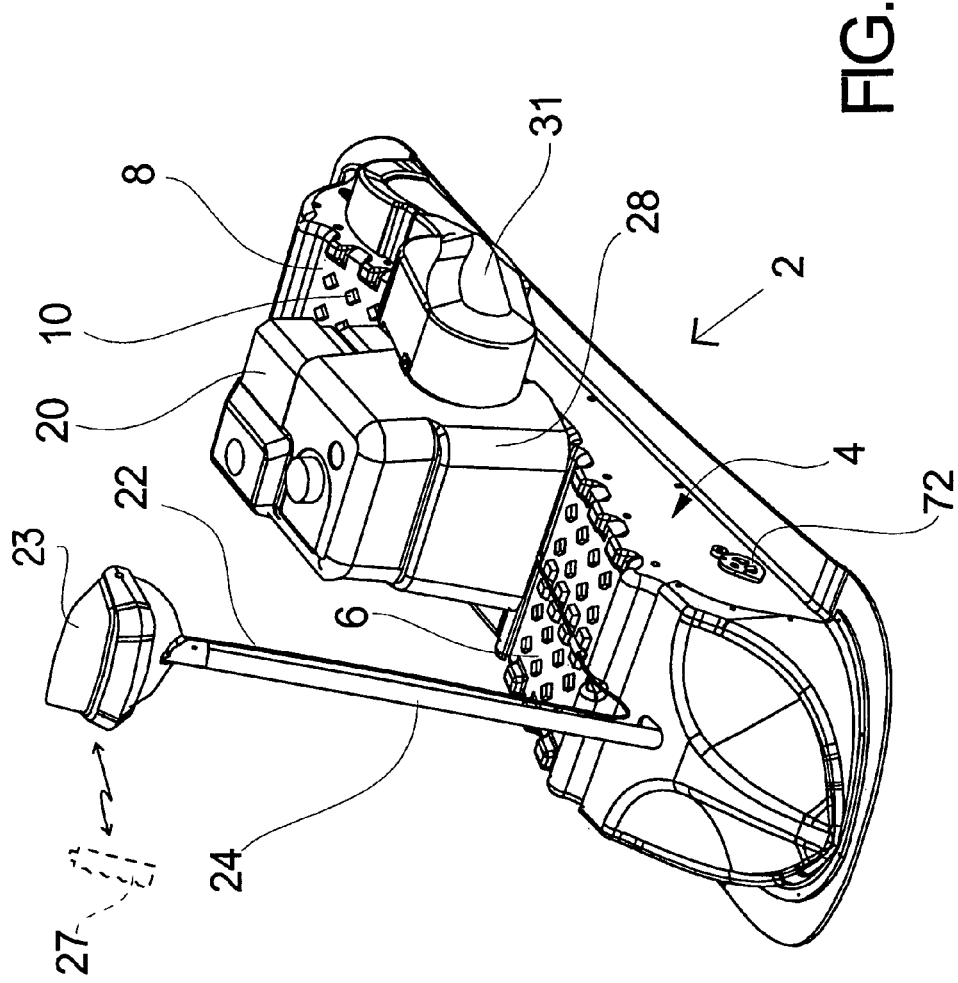
FIG. 1 shows a perspective view to a personal, engine powered snowboard assembly.
Figure 2:
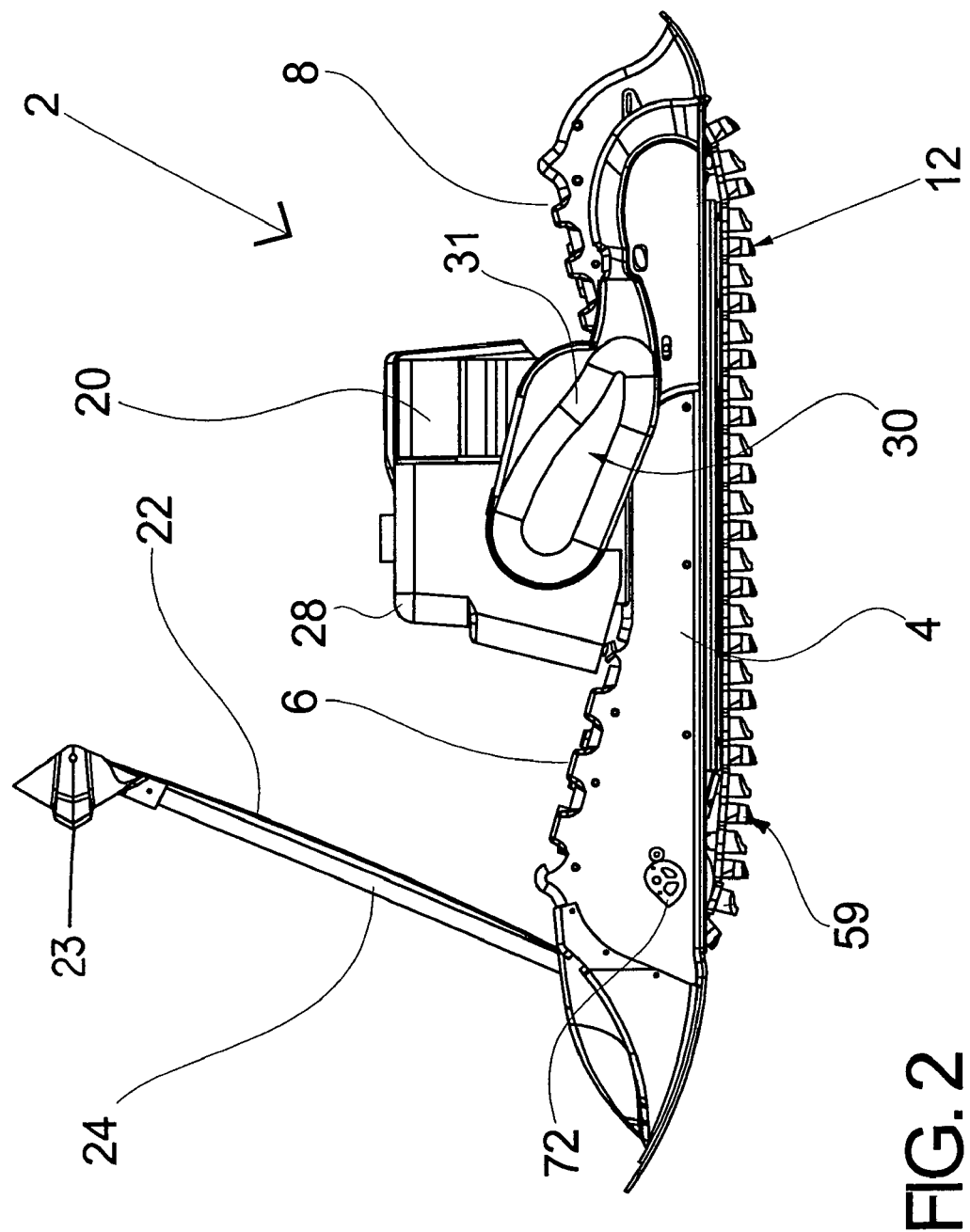
FIG. 2 shows a right side view of the snowboard assembly and wherein the mounting relationship of the engine, clutch, and chain and belt track drive linkages are more apparent.

With attention to the perspective view of FIG. 1, an improved snowboard assembly 2 of the invention is shown. The assembly 2 provides a framework or chassis 4 that is formed to support an upright operator. Fore and aft operator or steering platforms 6 and 8 are shaped and oriented to comfortably support an operator's booted feet. The exposed surface of each of the two platforms 6 and 8 is constructed to provide traction to facilitate operator steering movements. The platforms 6 and 8 can include surface knurling, granular coatings, fastened matting or other traction enhancing materials 10 that assure non-slippery contact with the platform surfaces during normal use. Straps, bindings or surfaces shaped to mate with an operator's foot ware (not shown) can also be provided at the platforms 6 and 8.

Each platform 6 and 8 is shaped and sized to accommodate independent movement of the operator's feet within the space and/or shifting of the operator's weight laterally and/or fore and aft. The shifting of the operator's weight particularly induces a supported drive track 12 shown at FIGS. 2-4 and 6-12 to flex and dynamically vary the contact of the track 12 with a bottom surface of a support pan 14 of the chassis 4 and ground engaging lugs at the track 12 with the snow. The support pan 14 is mounted between longitudinal flanges 63 and 65 of the chassis 4. Steering is thus obtained with the dynamic changes in track contact with the supporting snow or ice.

Steering control is particularly obtained by constructing the support pan 14 to include elongated contoured edge surfaces 66 and 68 (e.g. beveled) that bound a longitudinal recess 18. The recess 18 can for example exhibit ellipsoid, ovular or other longitudinal arcuate-shaped sidewalls 19. The surfaces 66 and 67 and recess 18 are aligned to cooperate with interior surfaces of the track 12 to direct track flexion and retain the track to the chassis 4 over a range of steering motions. Simultaneous variations in vehicle speed can be applied to modulate steering motions. Particular details to the construction of the contoured edge surfaces 66 and 67 and recess 18 and responsive flexion of the track 12 are discussed below with respect to FIGS. 7 through 10. One or more rails might also be provided alone or in combination with the recess 18 to limit lateral track movement and facilitate track retention.

A gasoline engine 20 (e.g. 5-10 hp) is mounted between the foot platforms 6 and 8. The engine 20 is located relative to the platforms 6 and 8 to slightly overweight the vehicle's aft end to maintain an upward trim angle at the fore end. The risks of possible operator discharge from the vehicle 2 due to proposing or nose-diving with a downward trim angle are thereby alleviated. A DC motor with a storage battery or other electrically powered motor or hybrid power source (e.g. gas and electric) with appropriate controls might alternatively be incorporated into the vehicle 2 in lieu of the gas engine 20.

A mechanical (e.g. cable) or electro-mechanical control linkage 22 extends from the engine 20 and is manipulated by the operator. The linkage 22 is routed along an upright support column 24 or can be held in an operator's hands. A cowling 23 covers hand controls 26 coupled to a cable 22 and fitted to the support column 24 are presently preferred. The column 24 also provides a degree of stabilization to the operator during steering motions. The shape of the column 24 (e.g. tilt angle, bends, supports etc.) and coupling to the chassis 4 can be adjusted as desired to accommodate operator ergonomics and stabilize the operator.

The shape of the column 24 (e.g. tilt angle, bends, supports etc.) and coupling to the chassis 4 can be adjusted as desired to accommodate operator ergonomics and stabilize the operator. Presently, the column 24 is fastened to the chassis 4 and several alternative mounting holes are provided to permit a 15° range of tilt adjustment. The column 24 is also constructed in sections that interlock and telescope relative to one another. The adjustments collectively allow the user to establish a desired operating column height and pitch angle.

Although a cable 22 is presently used, a wireless, radio frequency (RF) electro-mechanical drive might also be adapted to the engine 20. In such a circumstance, an operator handheld controller 27 (shown in dashed line) might transmit RF signals via provided actuators (e.g. button, slide or joy stick) and a transceiver to one or more electro-mechanical servos (e.g. relays, solenoids, pistons) responsively coupled to the vehicle 2 (e.g. engine throttle). Engine operation and other operating mechanisms and parameters might thereby be controlled. Other servos might be mounted to the chassis 4, for example, to vary the shape of the support pan 14, change the ground contact surface of the chassis 4 or directly interact with flexible steering surfaces to direct track flexion.

In the latter regard, one or more flexing members, slide pads or roller(s) 29' (shown in dashed line at FIGS. 3 and 10) can be mounted to bear on an appropriate interior surface(s) of the track 12 to flex the track 12 and induce a desired steering. The rollers 29' can exhibit different shapes (e.g. circular, elliptical) or be mounted for eccentric rotation from a supporting assembly. The rollers 29' might also be mounted to a support frame that actively or passively moves relative to the support pan 14 to appropriately flex filamentary members at the track 12. Control of the rollers 29' might be actively directed with linkages that direct the rollers 29' to contact the track with varying force at preferred locations (e.g. bounded or unbounded filamentary pieces) as appropriate. Details to the construction of the track 12 and cooperation with the chassis 4 to effect steering are provided below.

The engine 20 is encased beneath a cover or safety shroud 28 to prevent operator contact with any moving parts or the exhaust system. The engine 20 is mounted to direct exhaust gases away from the operator. A hinged shroud 31 is mounted to the side of the shroud 28 and covers a clutch and drive linkage assembly 30 coupled to the track 12. The chassis 4 can include other safety features and can be formed to exhibit any desired aerodynamic and/or aesthetic shape. The chassis 4 might also be constructed to accommodate multiple operators, passengers or permit towing of sleds or accessory appliances.

With attention to FIGS. 2 through 5, views are shown to the drive linkage 30. The linkage 30 includes a centrifugal clutch 32 that is mounted to an output shaft 33 of the engine 20. A drive belt 34 extends from the clutch 32 and is trained around another centrifugal clutch 36 supported to a transfer shaft 38. A belt 40 is trained from another sprocket (not shown) mounted beneath the clutch 36 to a sprocket 44 fitted to an idler shaft 46. Yet another belt 48 extends to a track drive shaft 50 and sprocket 52 mounted to the shaft 50.

A track drive sprocket 54 is centered on the shaft 50 and provides several lateral extending teeth 56 that engage upright drive lugs 58 that project from an interior surface of the track 12. Multiple drive sprockets 54 can also be fitted to the chassis 4. Exposed ground lugs 59 depend from the exterior surface of the track 12 and engage the snow. The ground lugs 59 are constructed and positioned to direct forward motion and facilitate steering.

Figure 3:
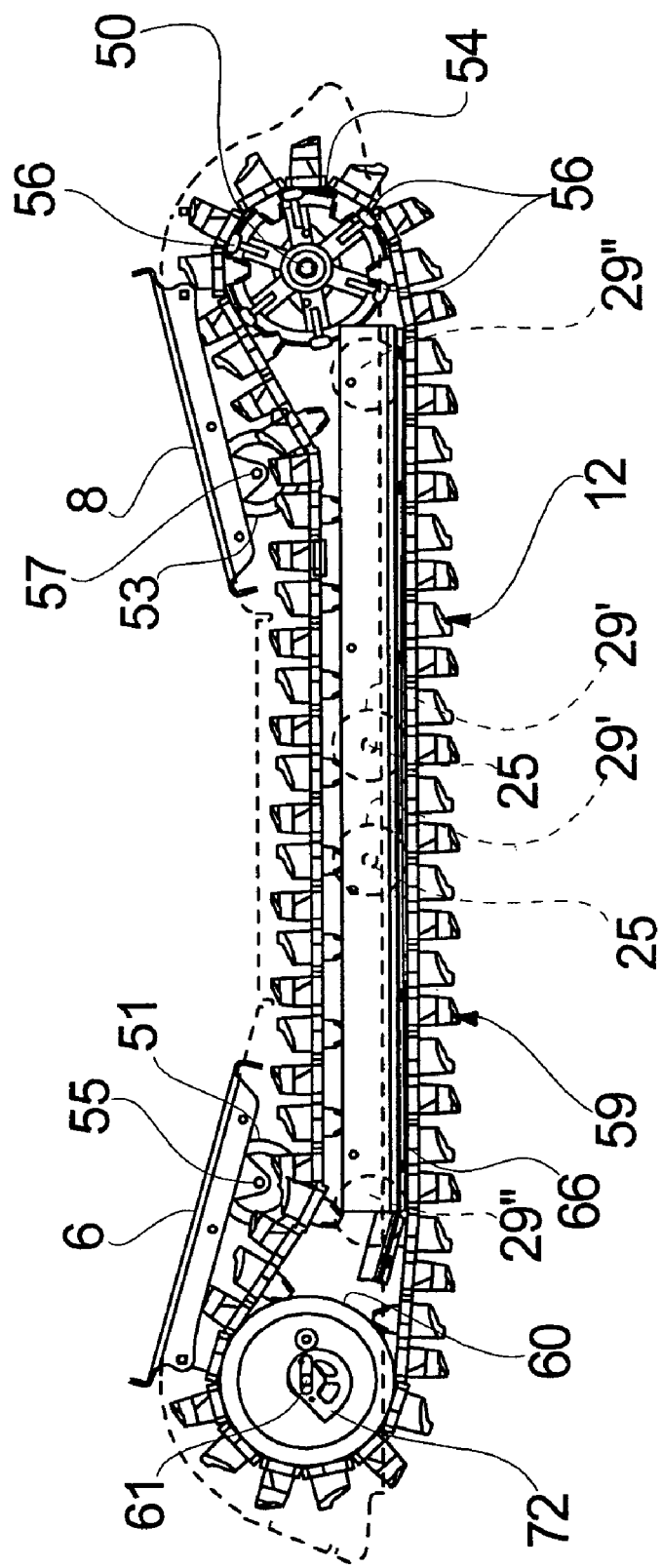
FIG. 3 shows a longitudinal cross section view to the track support frame, drive and idler sprockets.
Figure 4:
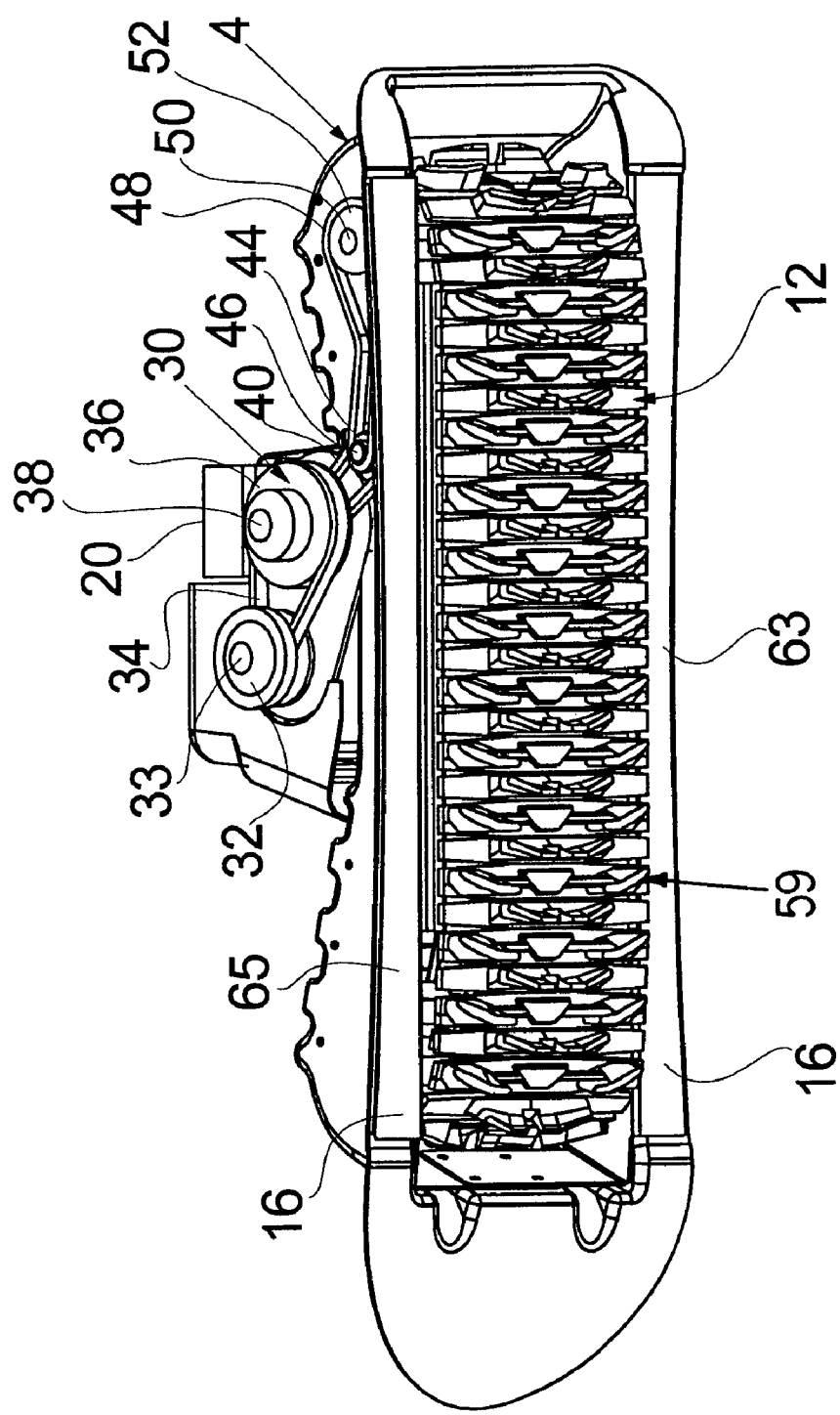
FIG. 4 shows a perspective view to the mounting relation of the track to the bottom track support pan and ground engaging surfaces of the snowboard assembly.

Separately depicted at FIG. 3 is a diagrammatic view to the routing of the track 12 relative to the chassis 4. The interior surface of the track 12 is trained around the aft drive sprocket 54 and a pair of forward idler wheels 60 mounted to an idler shaft 61. The chassis support pan 14 supports the bottom of the track 12 intermediate the aft sprocket 54 and front wheel (s) 60. Several rubber coated idler wheels 51 and 53 ride on the upper surface of the track 12. The idler wheels 51 and 53 are mounted to intermediate idler shafts 55 and 57 fitted to the chassis 4. The idler wheels 51 and 53 support the track 12 to direct the track in non-contacting relation beneath the foot support platforms 6 and 8 and engine 20. The idler wheels 51, 53 and 60 are mounted to be adjustable and/or resiliently biased to maintain a relatively constant tension on the track 12. The wheels 60 can also support agitators discussed below at FIG. 27 to pulverize and exhaust collected snow and ice and improve track control and vehicle performance.

Figure 5:
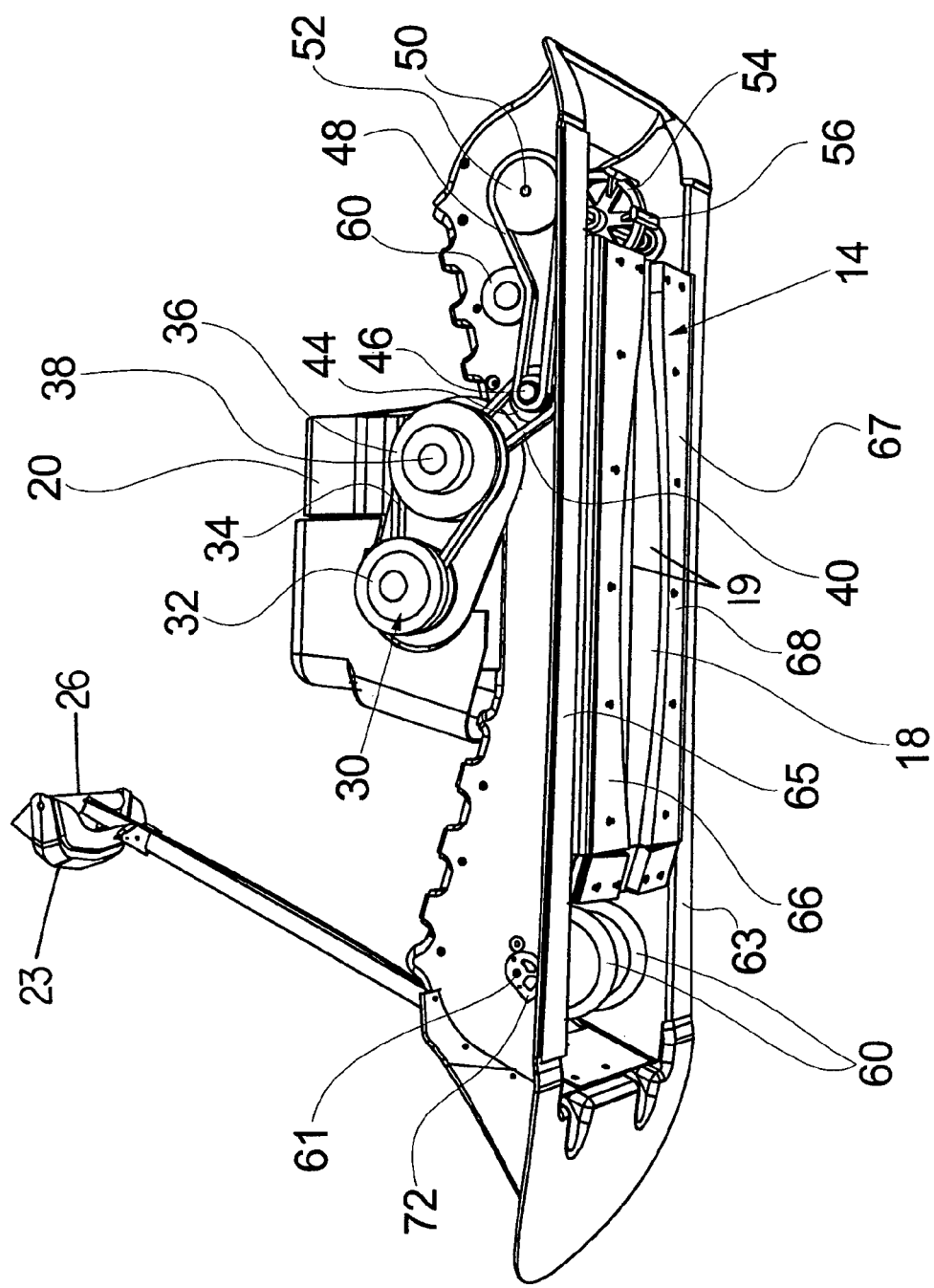
FIG. 5 shows a perspective view to the right side and bottom control surface of the snowboard assembly with the drive linkage cowling and track removed.

With additional attention to FIG. 5, the track 12 otherwise contacts and rotates over the contoured, longitudinal slide surface of the support pan 14. Exposed longitudinal flanges 63 and 65 of the chassis 4 extend along the sides of the support pan 14 and glide over the snow. Adjacent the flanges 63 and 65 are contoured surfaces 66 and 68 of the support pan 14 that exhibit a slight V-shaped bevel when viewed end-on, reference FIGS. 10 and 12. The drive lug recess 18 extends the length of the support pan 14 and is centered between the track contact surfaces 66 and 68. The drive lugs 58 rotate in the recess 18. More details to the cooperation of the track 12 with the beveled surfaces 66 and 68 to achieve steering are discussed below with respect to FIGS. 9 through 12.

Mounted to the chassis 4 to engage opposite ends of the forward idler axle 61 are adjustable tensioners 72. The tensioners 72 are supported to direct the shaft 61 in a differential eccentric fashion. Upon rotating the tensioners 72 relative on the shaft 61, eccentric surfaces or an eccentric action of the tensioners 72 direct the idler wheels 60 fore or aft to vary the tension of the track 12. The tension is normally set to center the rotation of the track 12 relative to the idler wheels 60 and support pan 14.

Figure 6:
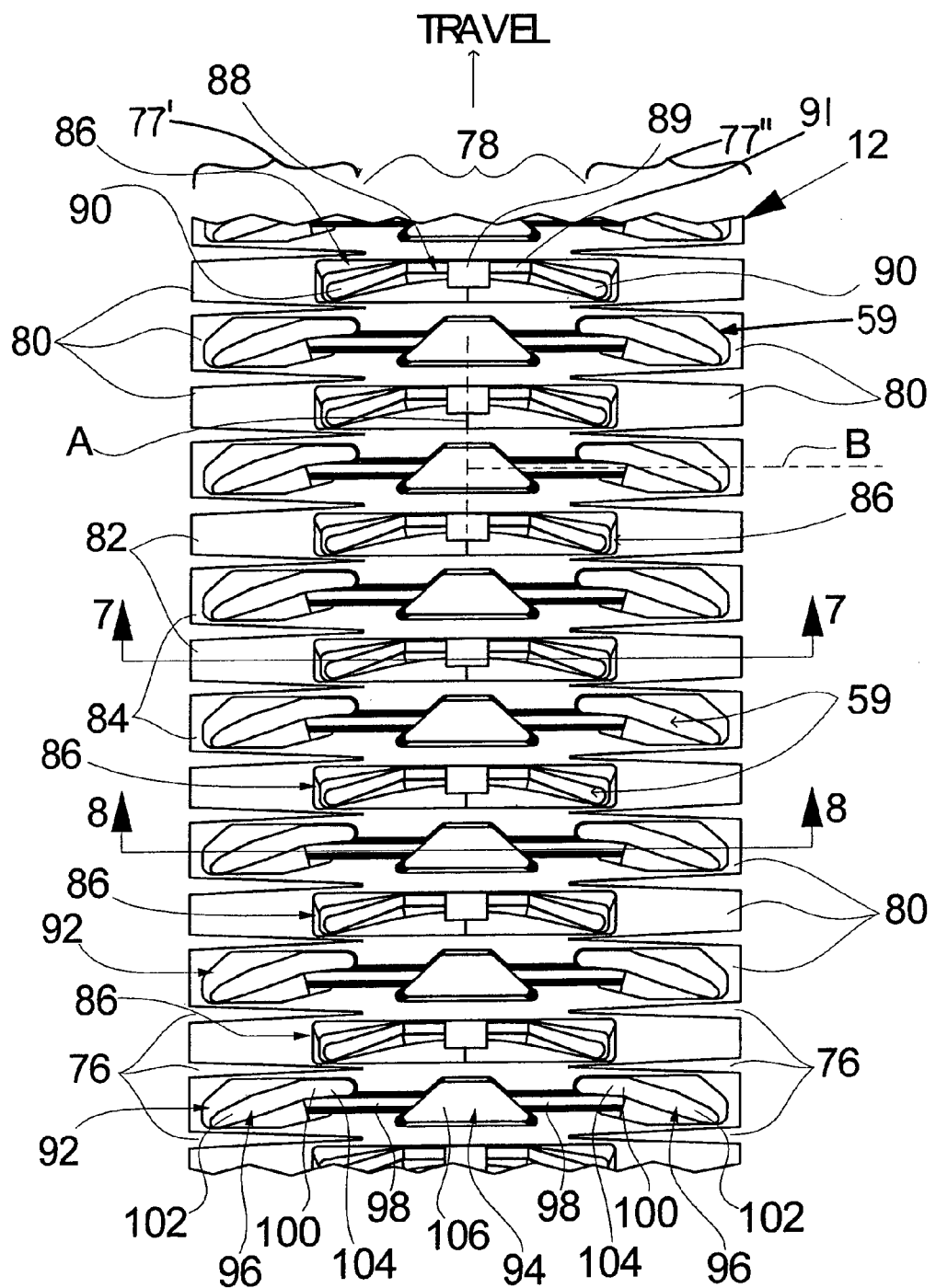
FIG. 6 shows a plan view of the ground engaging, exterior surface of the track depicting the arrangement of the displaced, transverse, laterally extending steering lugs.
Figure 7:
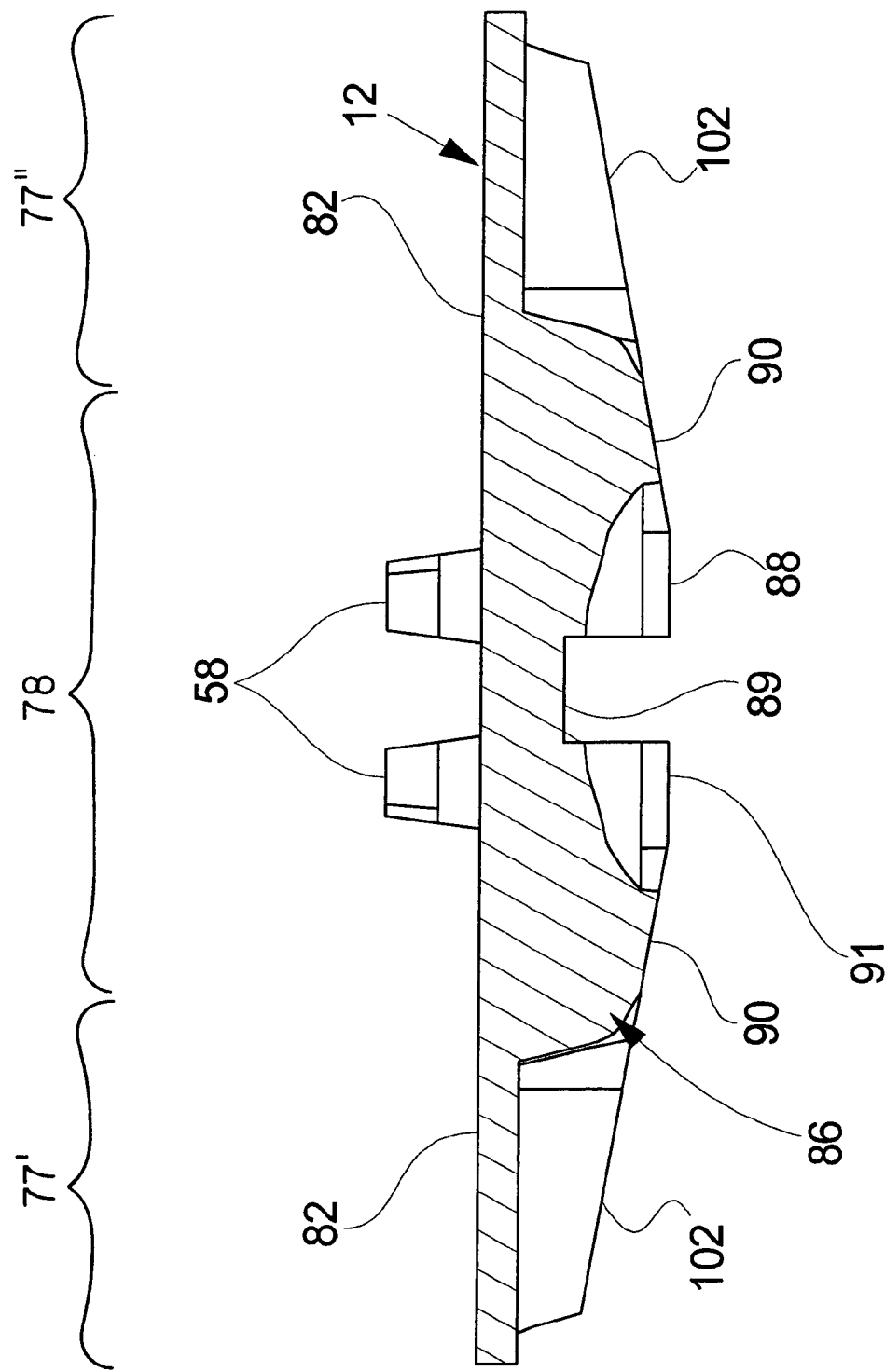
FIG. 7 shows a transverse cross section view through the track taken along reference lines 7-7 of FIG. 6.
Figure 8:
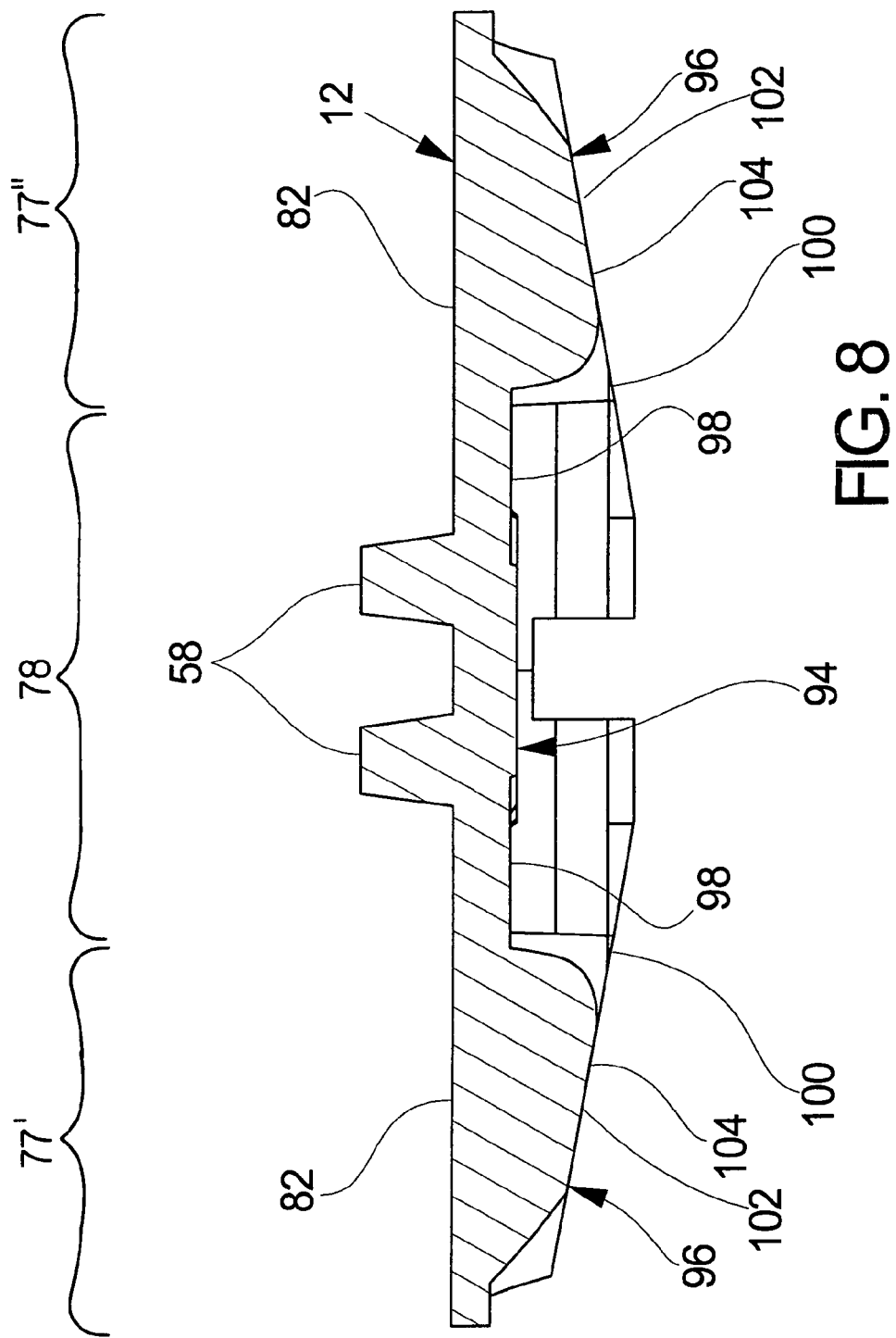
FIG. 8 shows a transverse cross section view through the track taken along reference lines 8-8 of FIG. 6.

The novel construction of the track 12 is particularly depicted at the partial plan and cross section views of FIGS. 6-8. The cooperation of the track surfaces with the support pan 14 to provide steering control and maneuverability over the snowboard 2 is shown and discussed with respect to FIGS. 9-12. Returning attention to FIG. 6 however and in distinction to a continuous, constant width belt, the belting of the track 12 is constructed with a number of lateral notches, gaps or slots 76 that are formed into left and right fringe portions 77' and 77" of the track 12. The slots 76 extend from a center drive portion or drive band 78 to left and right peripheral edges of the track 4. The slots 76 define flexible track pieces or filamentary fringe pieces 80 at the fringe portions 77' and 77" that radiate from the central drive band 78 relative to a longitudinal center axis "A" along transverse axes "B". Smooth interior surfaces 82 of the fringe pieces 80 engage the beveled edge surfaces 66 and 68 of the support pan 14. Although the slots 76 are shown open ended, the slots 76 may be closed ended. That is, the filamentary members 80 may be bounded by portions of the track 12

A series of laterally displaced drive lugs 58 project from the interior surface of the drive band 78 and engage the sprocket teeth 56 and pass along the central portion of the pan 14 at the recess 18, reference FIGS. 7 and 8. Rows of the ground engaging ground lugs 59 depend from the opposite, exterior side of the drive band 78 and the fringe pieces 80. The ground lugs 59 are shaped and arranged to optimize forward travel.

The ground lugs 59 are organized into alternating rows 82 and 84 of lugs 86 and 92 that exhibit shapes designed to optimize vehicle performance over snow. The rows 82 each provide a single lug 86 that approximately spans the width of the central band 78. The lugs 86 depend from the track 12 between the overlying drive lugs 58. Each lug 86 provides an upright center piece 88 having a center recess 89. End pieces 90 extend at obtuse angles from opposite ends of the center piece 88. Leading and lagging surfaces (relative to the track travel direction) of the lug pieces 88 project from a relatively wide base at the track surface to a narrow elevated apex 91. The lugs 86 thereby exhibit an elongated, inverted V-shape relative to the rotational travel direction of the track 12.

The alternating rows 84 separately provide lugs 92 that span both the center drive band 78 and the fringe pieces 80. The rows 84 extend beneath the drive lugs 58. Each lug 92 is constructed of a trapezoid or pyramidal-shaped center piece 94 and laterally displaced end pieces 96. The center and end pieces 94 and 96 are coupled together with straight, upright web pieces 98.

The end pieces 96 extend the width of the fringe pieces 80 at the rows 84. The end pieces 96 include short horizontal sections 100 and longer end steering sections 102 that extend at obtuse angles from the horizontal sections 100. The lug and web pieces 96 and 98 project from a relatively wide base at the track surface to a narrow apex 104. The center piece 94 rises to an apex 106 approximately twice the width of the apex 104.

The lugs 92 also exhibit an elongated, beveled V-shape relative to the ground and rotational travel direction of the track 12. Rotation of the center pieces 94 overlaps the regions of ground contact of the lugs 86 and movement of the fringe pieces 80 and particularly the end sections 102 provides steering control.

Figure 9:
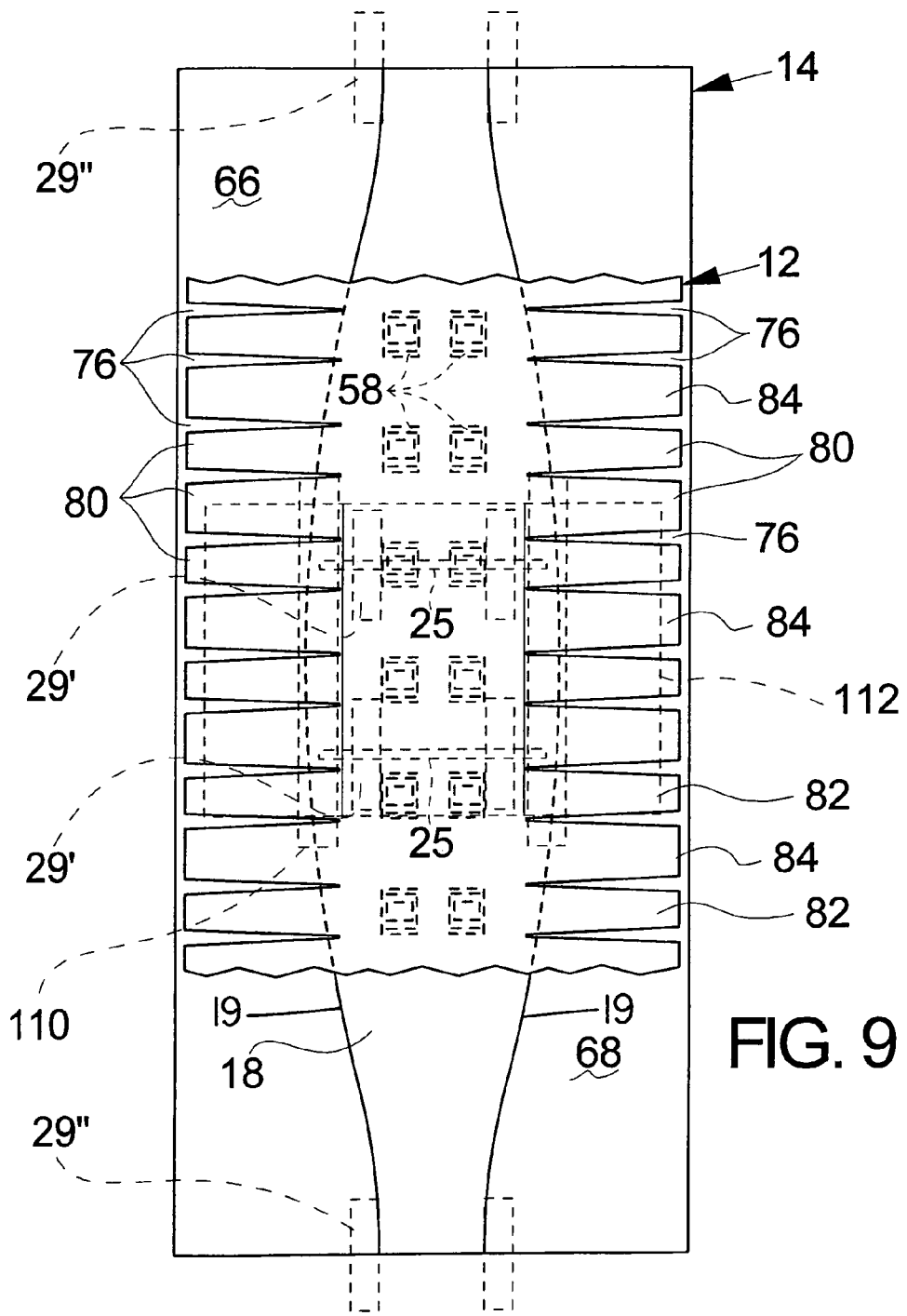
FIG. 9 shows a diagrammatic plan view of a portion of the track in an un-flexed, straight line condition and wherein alternative operator directed, wheeled steering assemblies (shown in dashed line) are mounted to mechanically flex the track.
Figure 10:
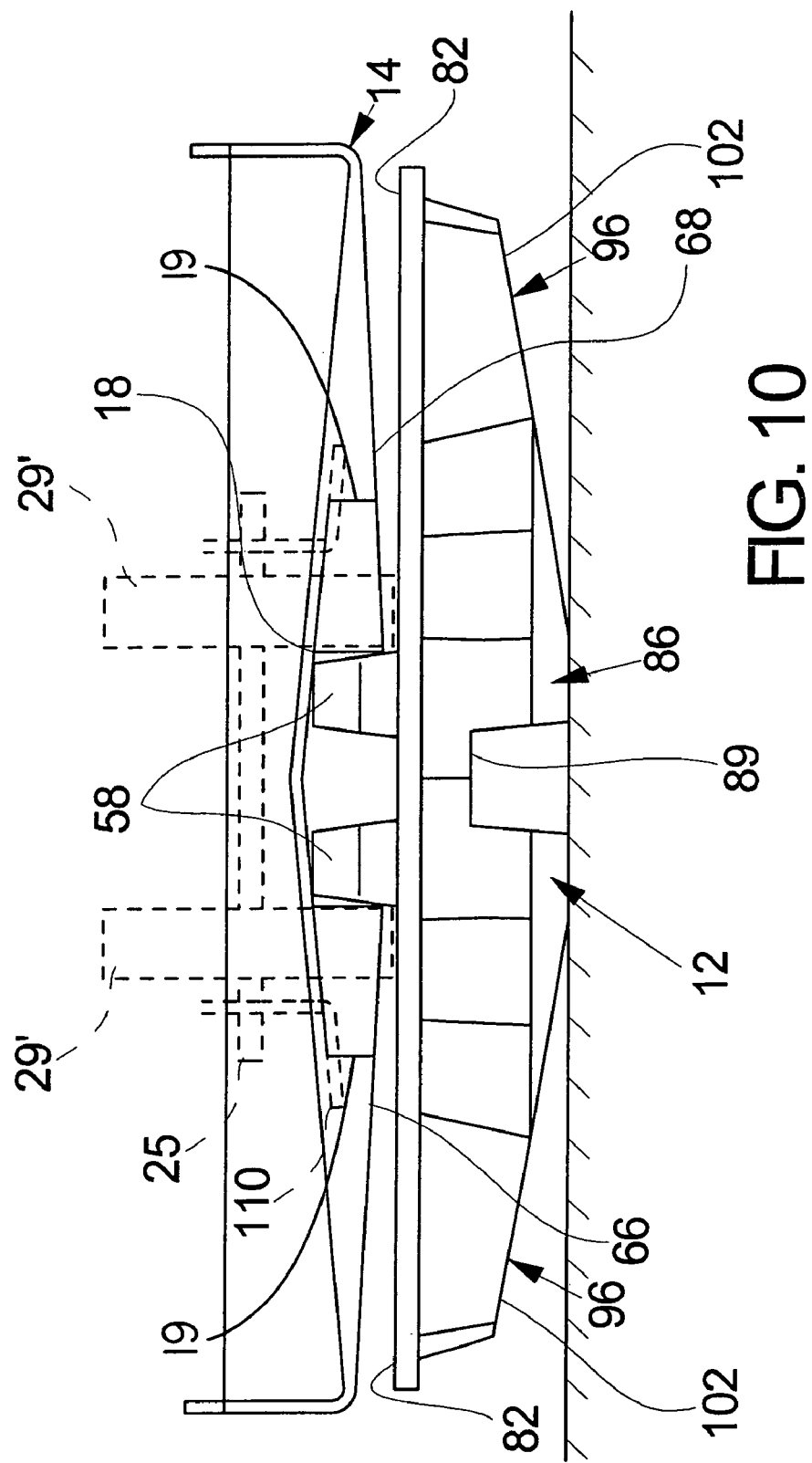
FIG. 10 shows an end view of the track centered along the chassis support pan in an un-flexed, straight line condition.

In the latter regard and with attention to FIGS. 9 through 12, vehicle steering is achieved by dynamically varying the contact of the smooth interior surfaces 82 of the fringe pieces 80 with the beveled support pan surfaces 66 and 68. FIGS. 9 and 10 depict a straight line condition wherein the operator's weight is centered on the chassis 4 with the support pan 14 generally riding horizontal to the ground. The fringe pieces 80 shown without the steering lugs 102 are correspondingly centered over the support pan 14.

Steering is achieved by varying the operator's position and/or weight on the operator platforms 6 and 8 to change the contact dynamics of the track 12 with the support pan 14. For example, as the operator applies weight to the left side of the chassis 4 and with attention to FIGS. 11 and 12, the support pan 14 tilts. The left side of the track 12 engages the snow, the fringe pieces 80 at the left fringe portion 77' collapse or compress inward against themselves as they contact the beveled edge surface 66 of the pan 14. The compression of the left side of the track 12 causes the left side to cup which action exaggerates the gripping action of the left side lug end sections 102 with the snow. The drive lugs 58 correspondingly move to the right in the recess 18 and contact the sidewalls of the recess 18.

The respective slots 76 and fringe pieces 80 at the right fringe portion 77" independently diverge and the interior surface 82 at the right side of the track 4 with limited contact with the beveled surface 68. The vehicle 2 responds to the opposing compression and expansion of the fringe pieces 80 at the slots 76 to turn left or right. The simultaneous gripping of the snow by the end pieces 96 of the drive lugs 58 enhances the responsiveness of the vehicle 2 to turn.

Figure 12:
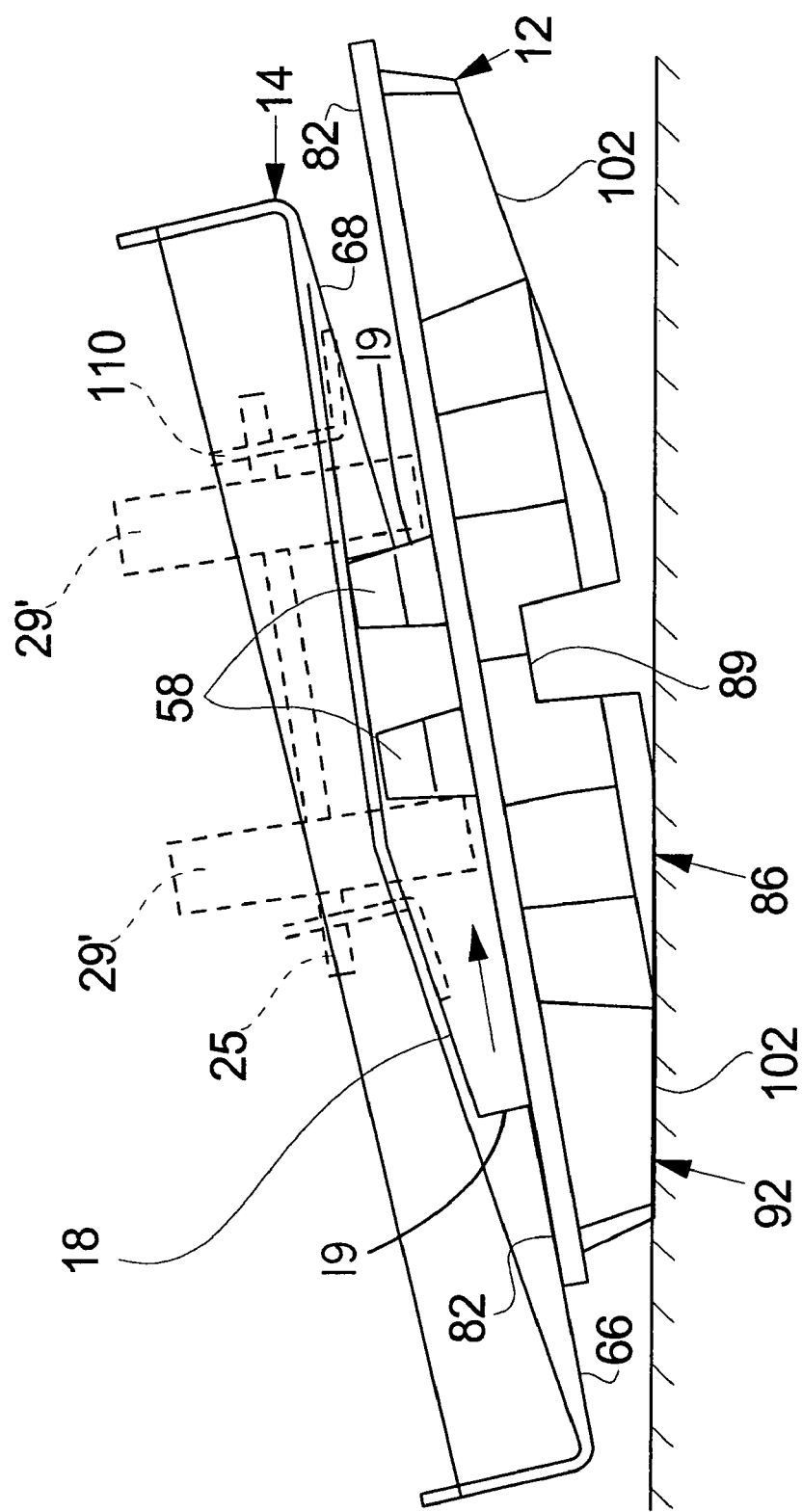
FIG. 12 shows an end view of the track laterally shifted relative to the chassis support pan corresponding to the flexed, turning condition of FIG. 11 and wherein operator directed steering members of the alternative assemblies of FIG. 9 are shown in dashed line.
Figure 13:
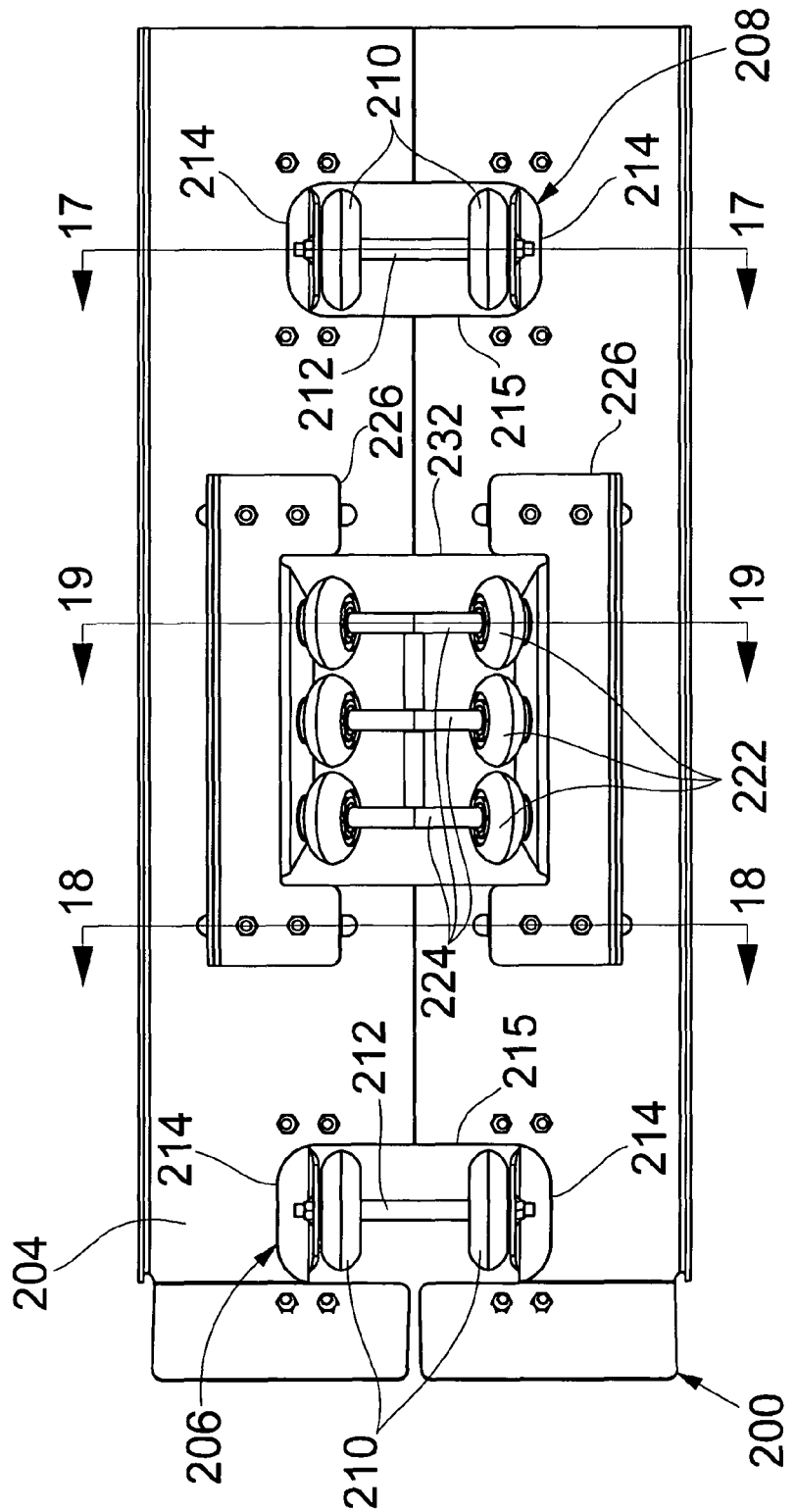
FIG. 13 shows a top plan view to an interchangeable chassis mounted track support pan having a wheeled slide assembly that mechanically flexes the track.
Figure 14:
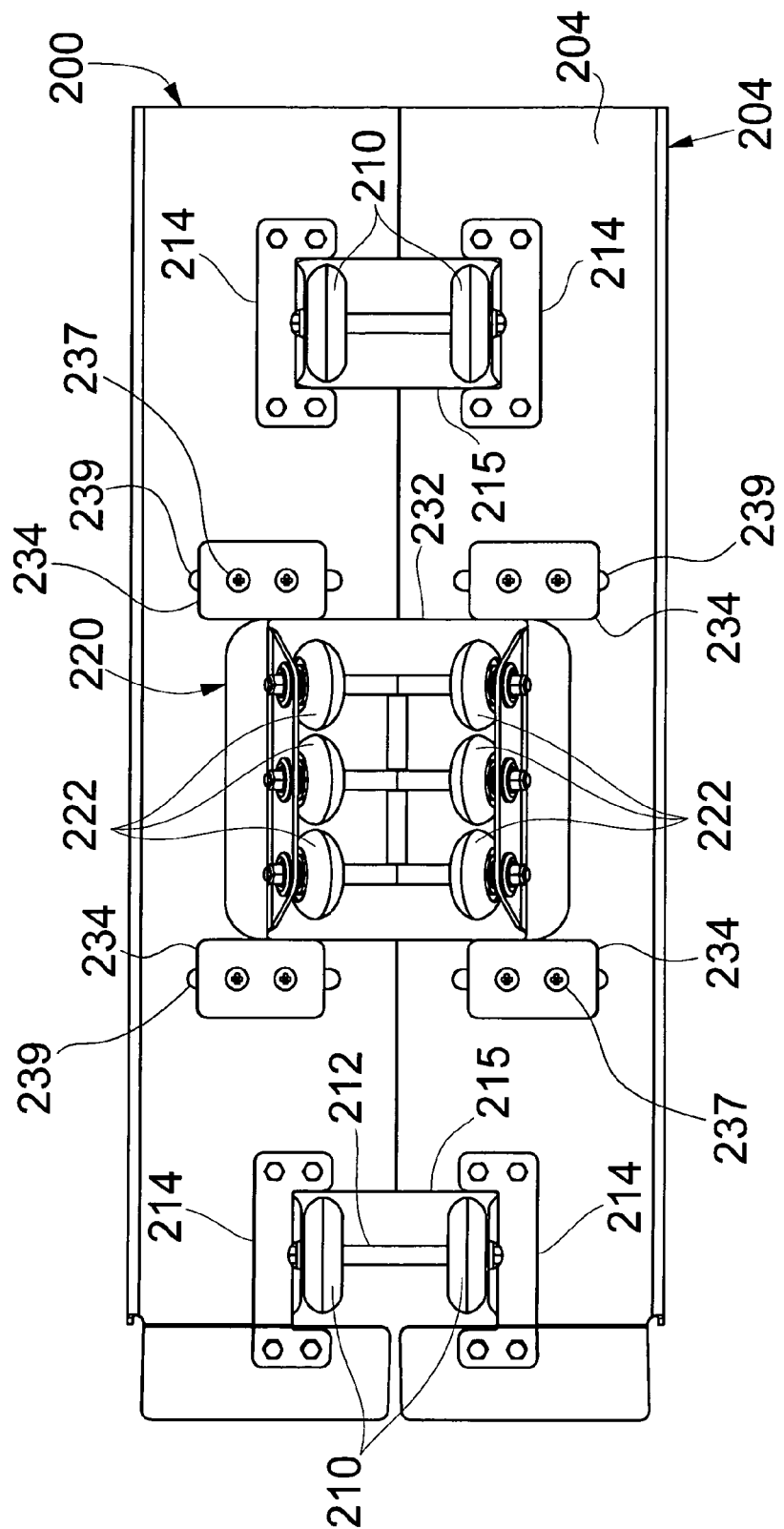
FIG. 14 shows a bottom plan view to the interchangeable track support pan assembly of FIG. 13.

In a similar fashion, the controlled application of force on the fringe pieces 80 via the steering rollers 29' shown in dashed line at FIGS. 9 and 12 can produce directional steering flexion. The flexion can be derived by depressing one side of the rollers 29' and/or elevating the other side relative to the fringe members 80. The axles 25 can be manipulated in different fashions similar to shifting an operator's weight to derive appropriate track contact. Additional steering rollers 29" shown in dashed line at FIG. 3 can also be mounted at the ends of the recess 18 to re-center the track 12 relative to the drive sprocket 54 and/or idler rollers 60.

Also shown at FIG. 9 in dashed line is a sliding assembly wherein steering rollers 29' and axles 25 are mounted to "L" brackets 110 that span a cutout region 112 in the pan 14. The brackets 110 permit the rollers 29' to laterally slide to and fro to engage the fringe members 80. Contact of the drive lugs 58 with the side walls 19 of the recess 18 or other pan surfaces limit lateral track movement. Stops (not shown) may also be fitted to the pan 14 to engage the brackets 110. The brackets 110, rollers 29' and/or axles 25 can be mounted for passive, operator directed movement or active movement with an appropriate actuator and linkage.

An alternative, presently preferred chassis pan/slide roller assembly 200 is shown in detail at FIGS. 13 through 19. The assembly 200 can be interchangeably mounted to the chassis 4 in lieu of the chassis support pan 14. The assembly 200 is used with a further improved track 230 having pleats 202 formed into the track 12 in lieu of slits 76. The assembly 200 can also be used with a track 12 having fringe members 80 in the fashion of the brackets 110 and rollers 29'. Views to the improved track 230 are depicted at FIGS. 20 through 26.

The assembly 200 provides a bent, elongated pan or plate 204 that substantially covers the bottom of the chassis 4 in the space between the drive sprocket 54 and idler wheels 60 and exhibits a concave or beveled, inverted V-shape relative to the ground when viewed end on, reference FIGS. 16-19. The plate 204 mounts to the chassis 4 in lieu of the chassis support pan 14. The assembly 200 serves the same general function as the chassis support pan 14, recess 8 and beveled edges 66 and 68.

Fore and aft guide wheel assemblies 206 and 208 are supported to the ends of the plate 204 as shown in FIGS. 13 through 17. The guide wheel assemblies 206 and 208 each provide a pair of domed plastic and/or rubber coated wheels 210. The wheels 210 are supported from a straight axle 212 that extends between right and left axle brackets 214. The brackets 214 are fastened to the plate 204 at openings 215. The wheels 210 contact the interior surface of the track 4 and align with the sides of the drive lugs 242 as the lugs 242 pass over the ends of the pan 204 to maintain the track alignment and prevent disengagement of the track 230 from the chassis 4.

Mounted between the center guide wheel assemblies 206 and 208 approximately midway along the plate 204 and shown in detail at FIGS. 13, 14 and 17-19 is a track steering assembly 220. The steering assembly 220 supports three paired sets of track flexion wheels 222. Each pair of wheels 222 is supported to a bent, inverted V-shaped axle 224, reference FIG. 19, that extends between right and left axle brackets 226. The steering assembly operates in the longitudinal space between the guide wheels 210.

The axles 224 are formed to align the wheels 222 relative to the brackets 226 and plate 204 to contact the drive lugs 242 and laterally direct the pleats 202 formed into the peripheral edges of the track 230. The axles 224 align the wheels 222 slightly offset (e.g. in a range of 15° to 25°) from being orthogonal to the plate 204. The domed or arcuate sides of the wheels 222 thereby maintain efficient contact with the track 230 and lugs 242 as they ride over the track 230. The ends of the axles 224 are secured to the brackets 226 with couplers 228 that contain spherical bearings 229. The couplers 228 and bearings 229 permit the axles 224 and wheels 222 to float or wobble as they contact the track 230. Although a particular axle 224 and coupler 228 have been shown, axles 224 of other shapes and cooperating with other couplers or connecting linkages can be used to obtain other floating assemblies with multiple axes of movement at the wheels 222.

The axle brackets 226 are retained to the lateral sides of a center aperture 232 formed into the plate 204. The brackets 226 are mounted in a fashion that permits a side-to-side reciprocating movement of the brackets 226. The movement is achieved with a retainer plate 234, high density slide bearings 235 (e.g. UHMW plastic) and bushings or spacers 236 that surround fasteners 237 used to capture the brackets 226, plates 234 and bearings 235 to slots 239 formed into the plate 204 adjacent the ends of the aperture 232.

Figure 11:
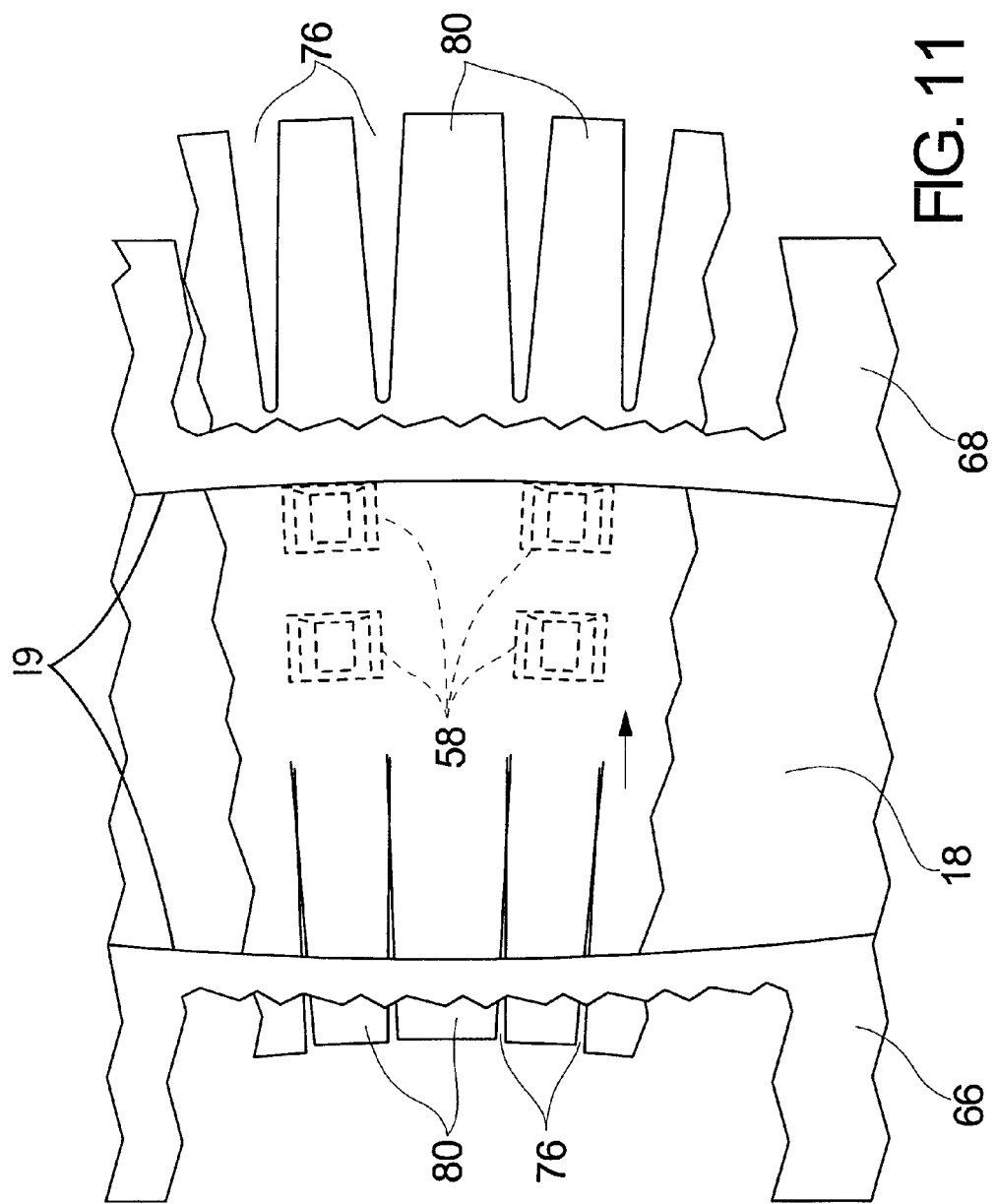
FIG. 11 shows a diagrammatic view of the interior surface of the track in a flexed, turning condition.

The bearings 235 and bushings 236 permit the brackets 226 and wheels 222 to freely slide to and fro relative to the aperture 232 independent of the freedom of movement of the brackets 226 and the spherical couplers 228. The wheels 222 are thus able to slide along the pan 204 and tilt or wobble and move laterally to accommodate operator steering motions. The combination mounting of the wheels 222 provides a firm grip of the track 230 and drive lugs 242, yet permits the wheels 222 to tilt and move as they encounter the lugs 242 and laterally direct the pleats 202 over the beveled surfaces of the pan 204 to flex and flatten the pleats 202. As one side of the pleats 202 flatten and expand with increased ground contact, the opposite side pleats relax and contract. The changing contour of the track 230 thus responds in a similar fashion to the fringed track 12 as shown at FIGS. 10 through 12 and varies the track's grip with the snow to steer the vehicle.

Figure 15:
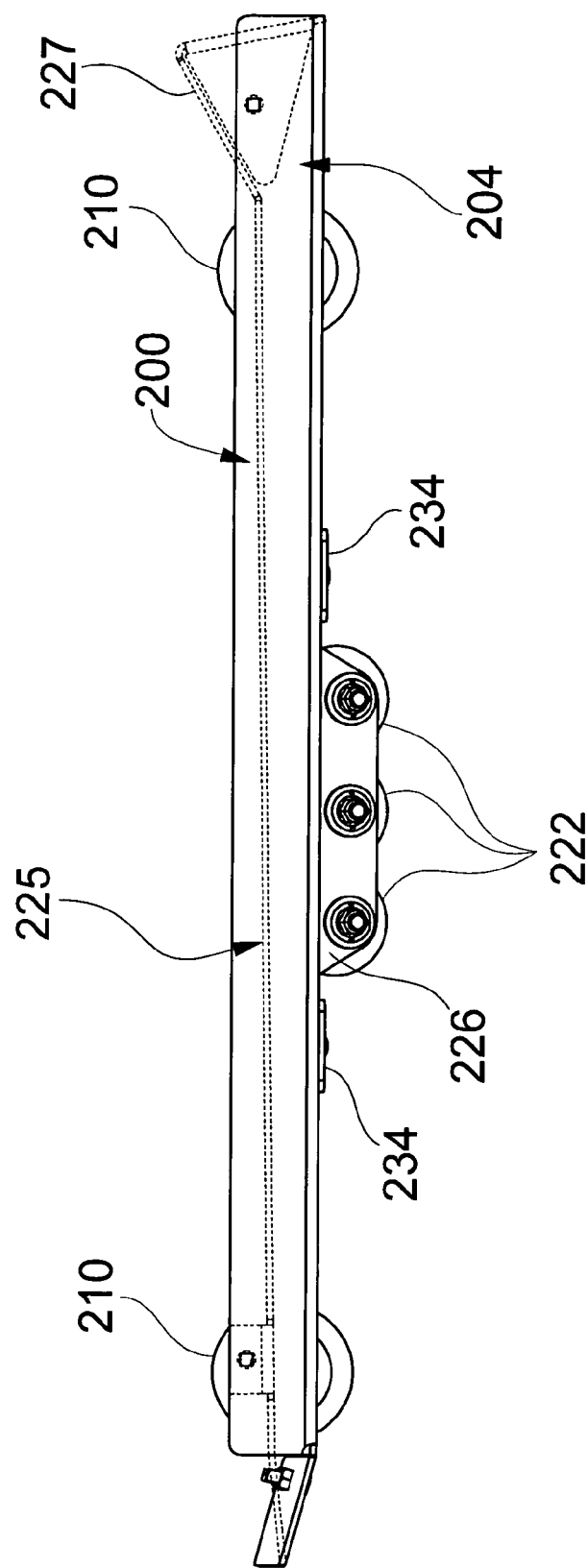
FIG. 15 shows a side plan view to the interchangeable track support pan assembly of FIG. 13.
Figure 16:
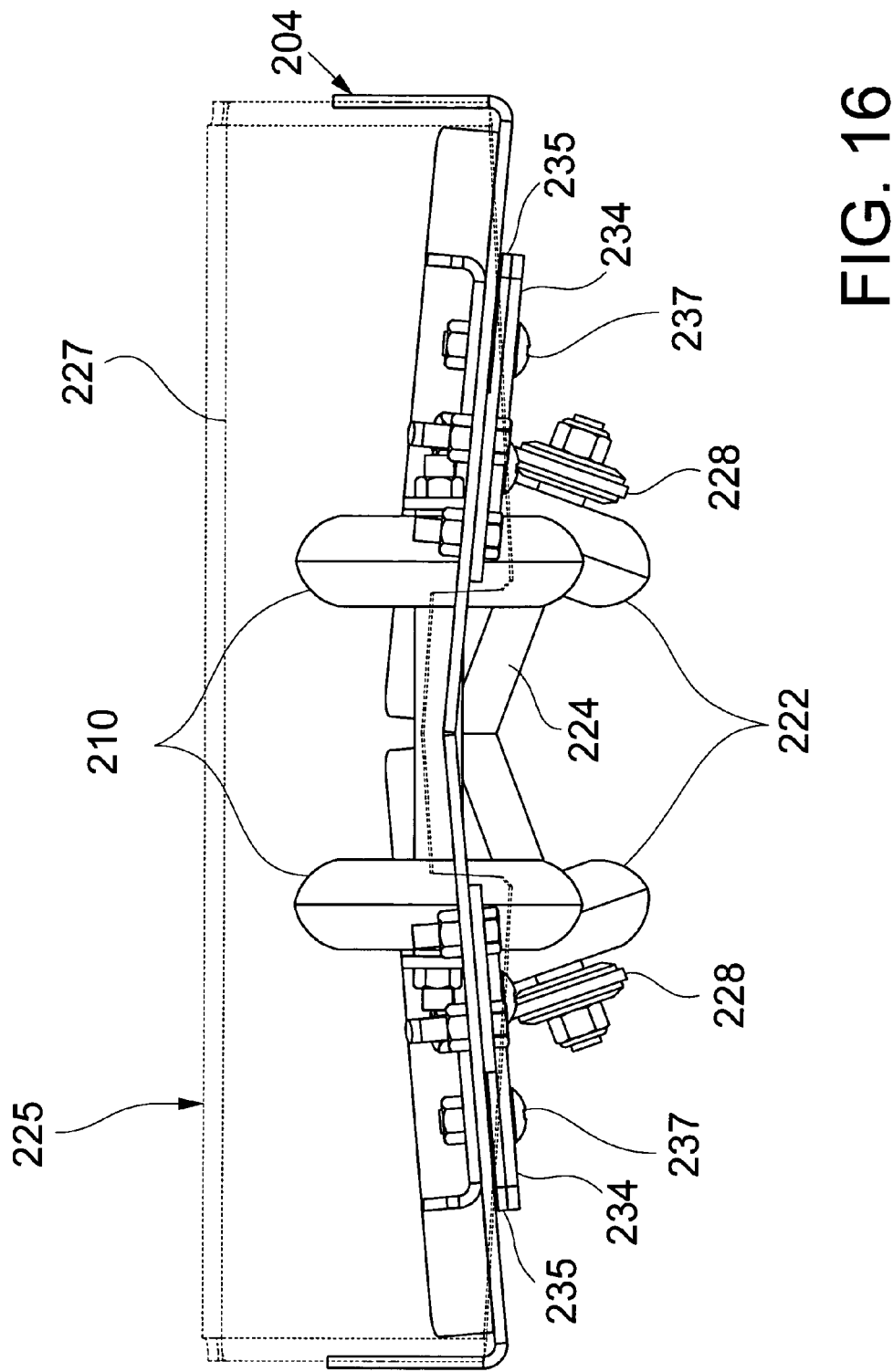
FIG. 16 shows a front plan view to the interchangeable track support pan assembly of FIG. 13.
Figure 17:
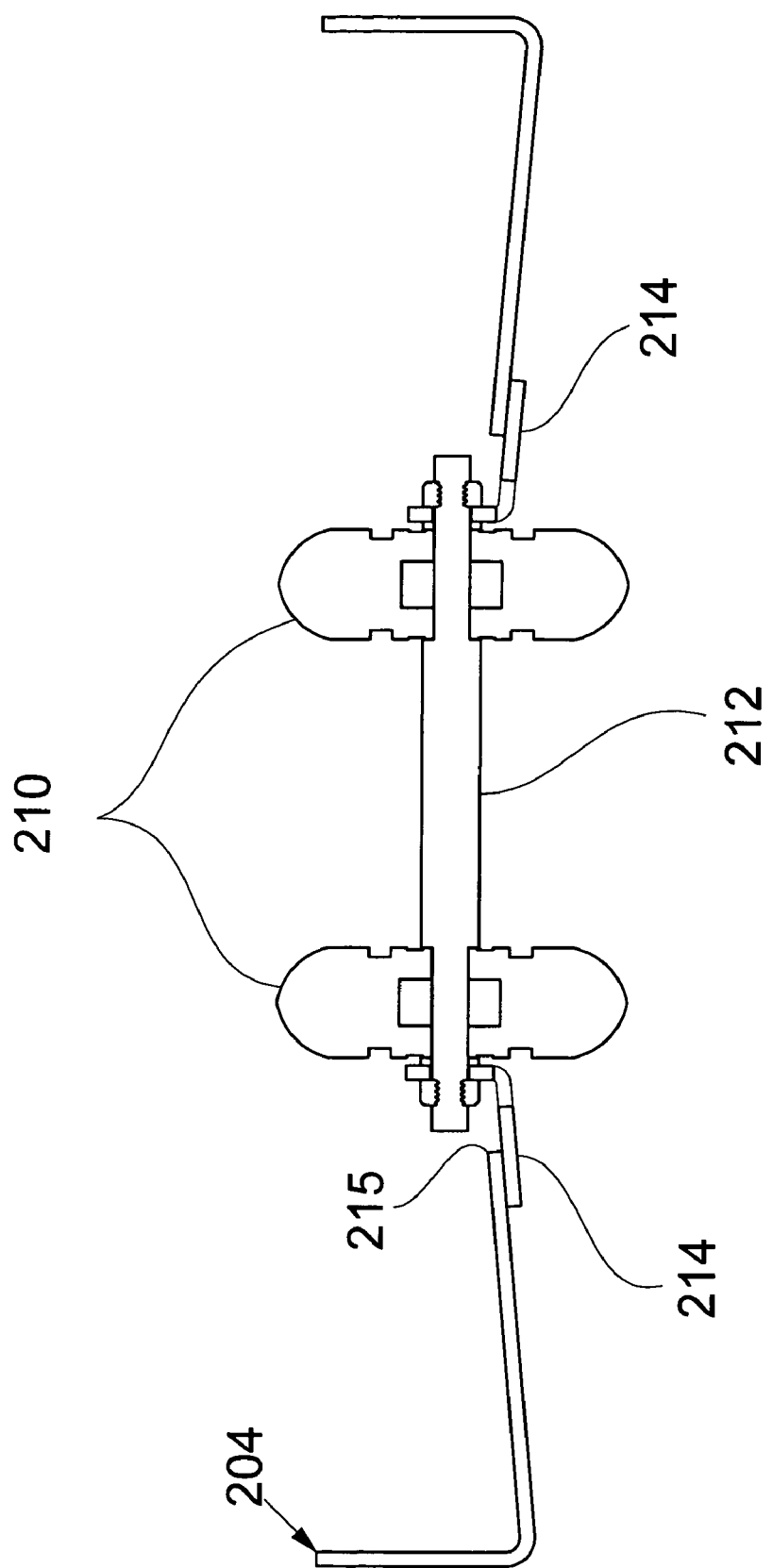
FIG. 17 shows a cross section view to the slide assembly taken along section lines 17-17 of FIG. 13.
Figure 18:
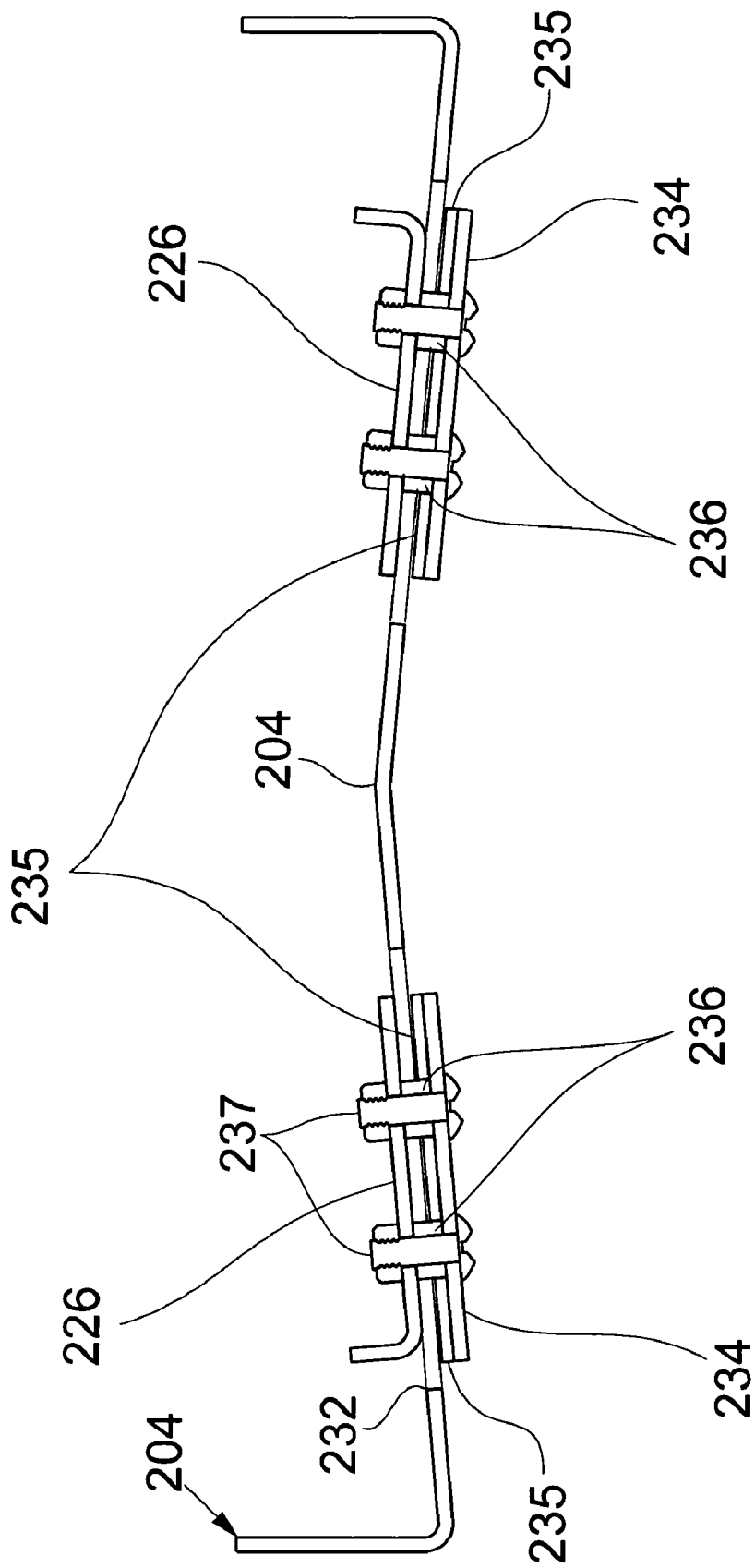
FIG. 18 shows a cross section view to the slide assembly taken along section lines 18-18 of FIG. 13.
Figure 19:
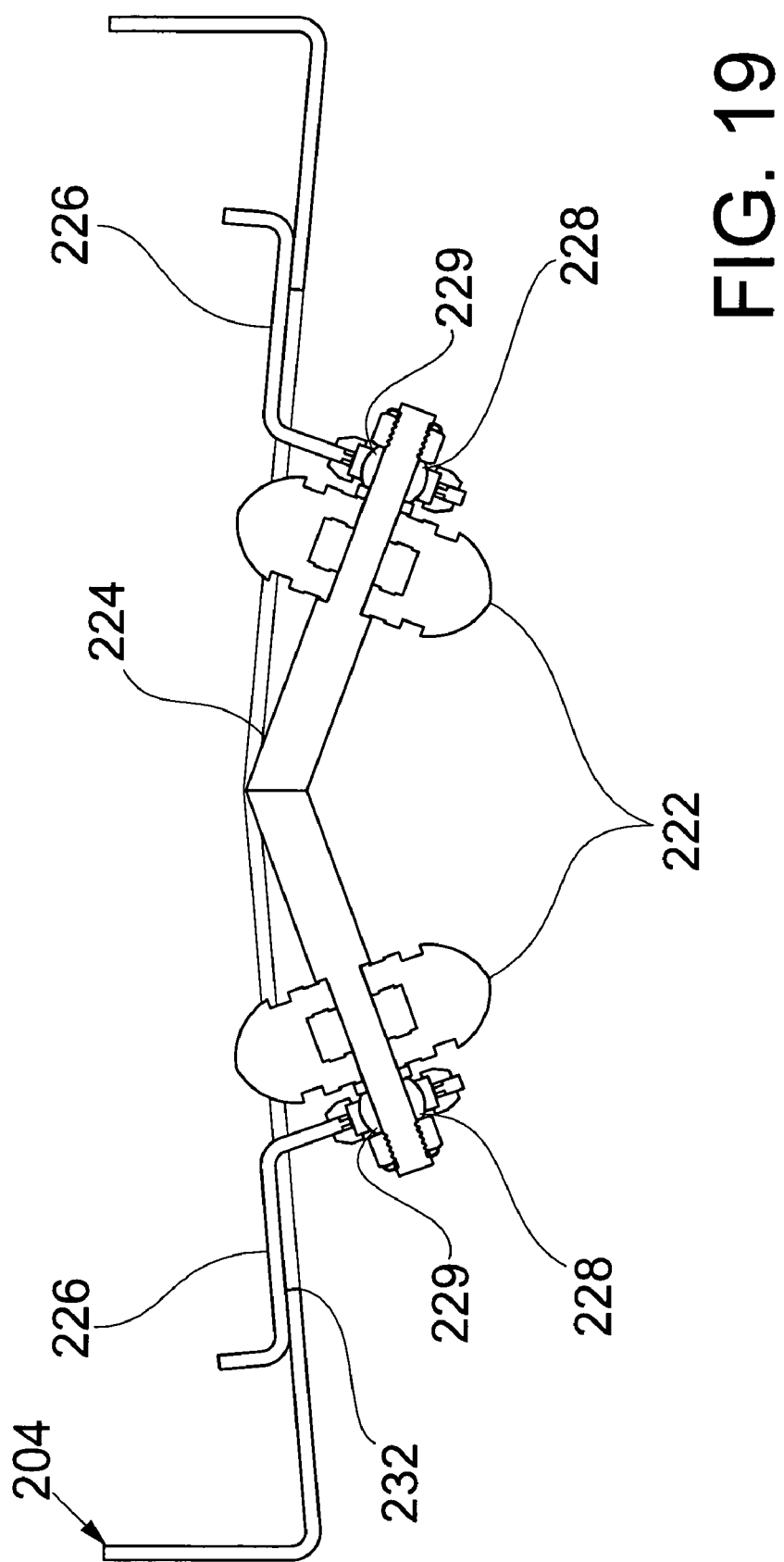
FIG. 19 shows a cross section view to the slide assembly taken along section lines 19-19 of FIG. 13.

FIGS. 15 and 16 further depict a plate or tray 225 (shown in dashed line) that can be fitted to the chassis 4 to prevent and/or minimize the collection of snow and ice between the chassis 4 and the support pan 204. The tray 225 particularly fastens to the support plate 204 and is positioned to direct snow that enters the apertures 215 and/or 232 forward with movement of the drive lugs 242 and raised slide surfaces 250 that are described in detail below. The surfaces 250 contain thermo formed UHMW track stiffener members 246 that are located and exposed at the interior surface of the track 230 to reduce the friction between the track 230 and the support pan 204.

Figure 20:
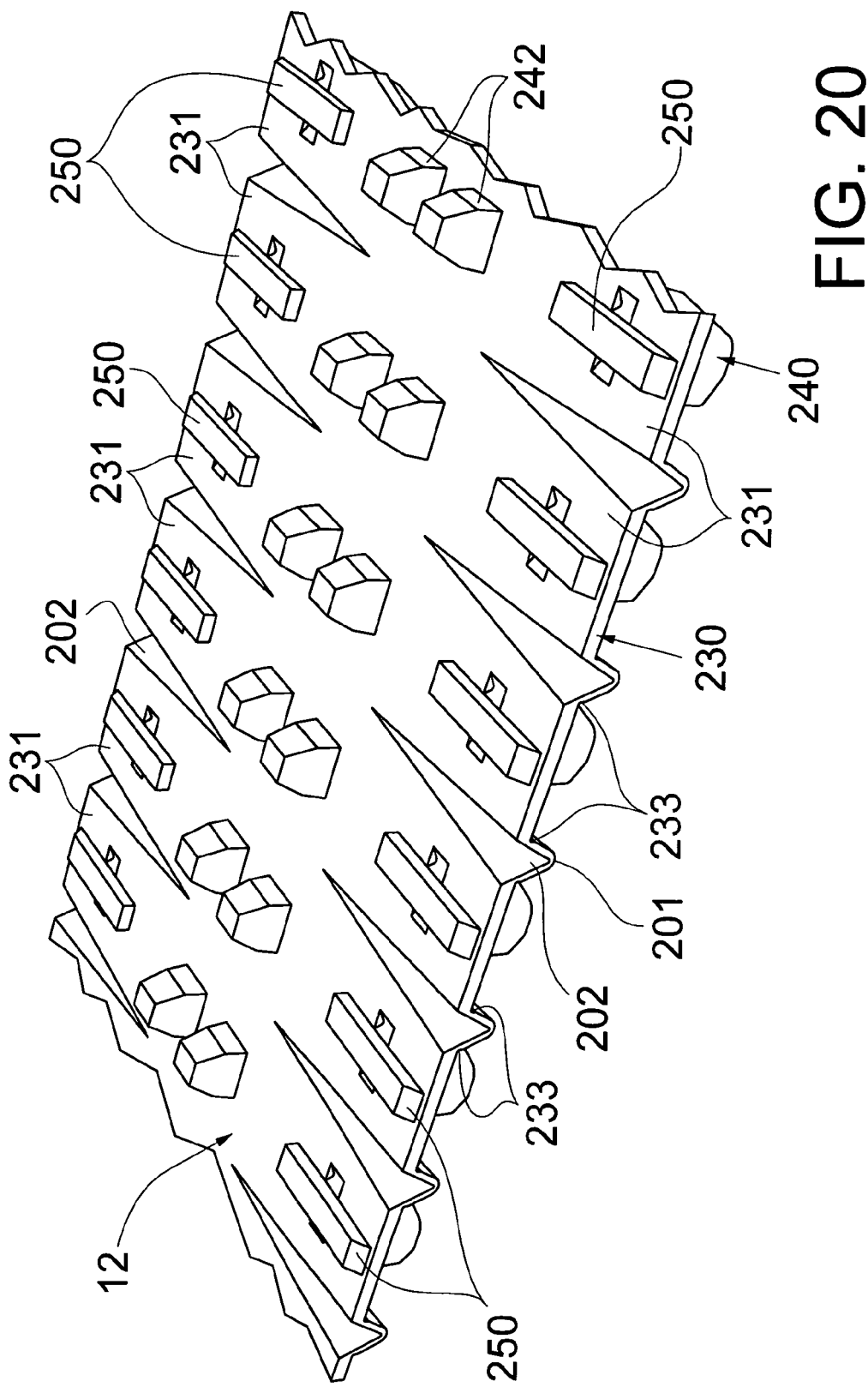
FIG. 20 is a perspective drawing top and side views to a section of a pleated, flexible track.
Figure 21:
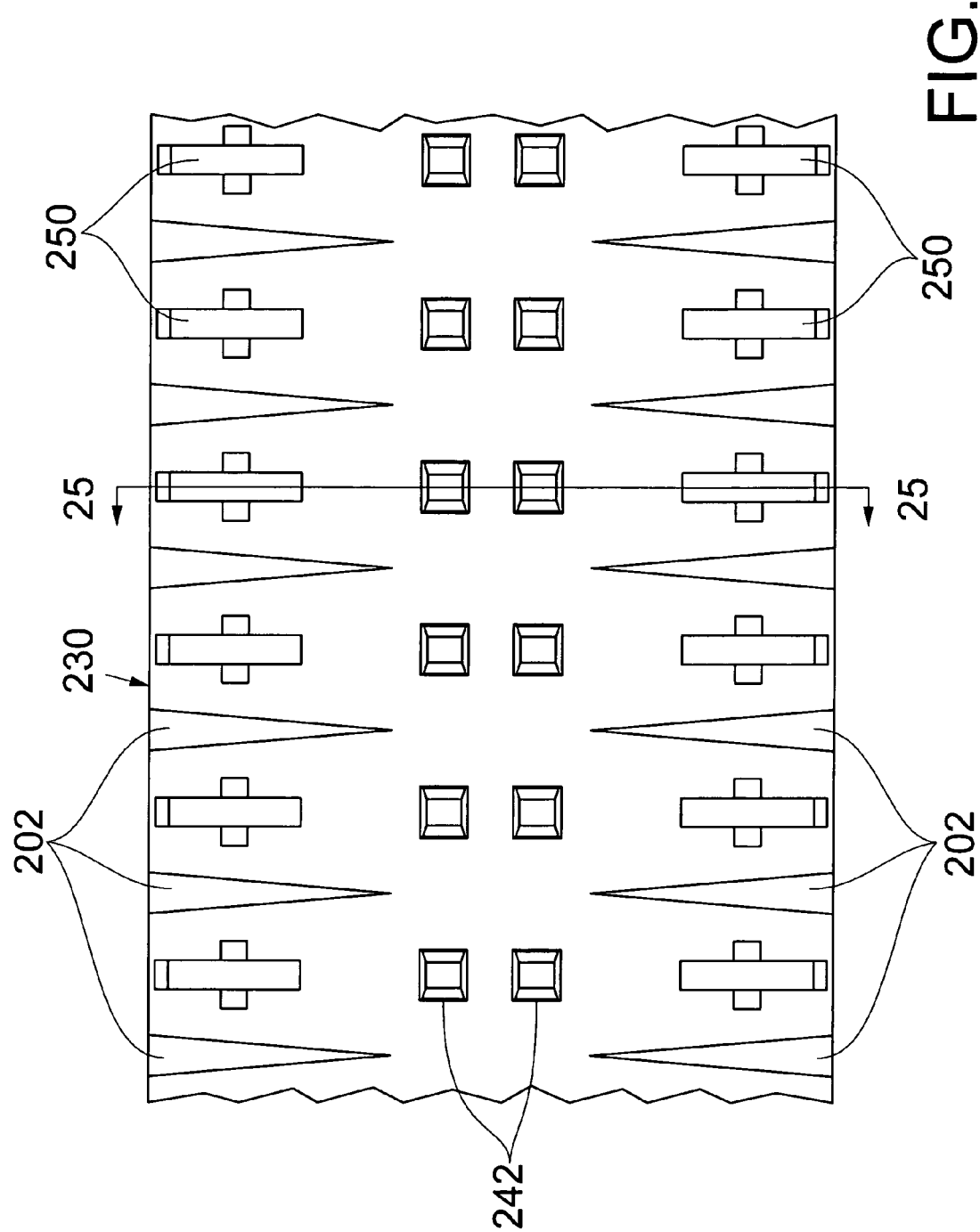
FIG. 21 shows a top plan view to the pleated track section of FIG. 20.
Figure 22:
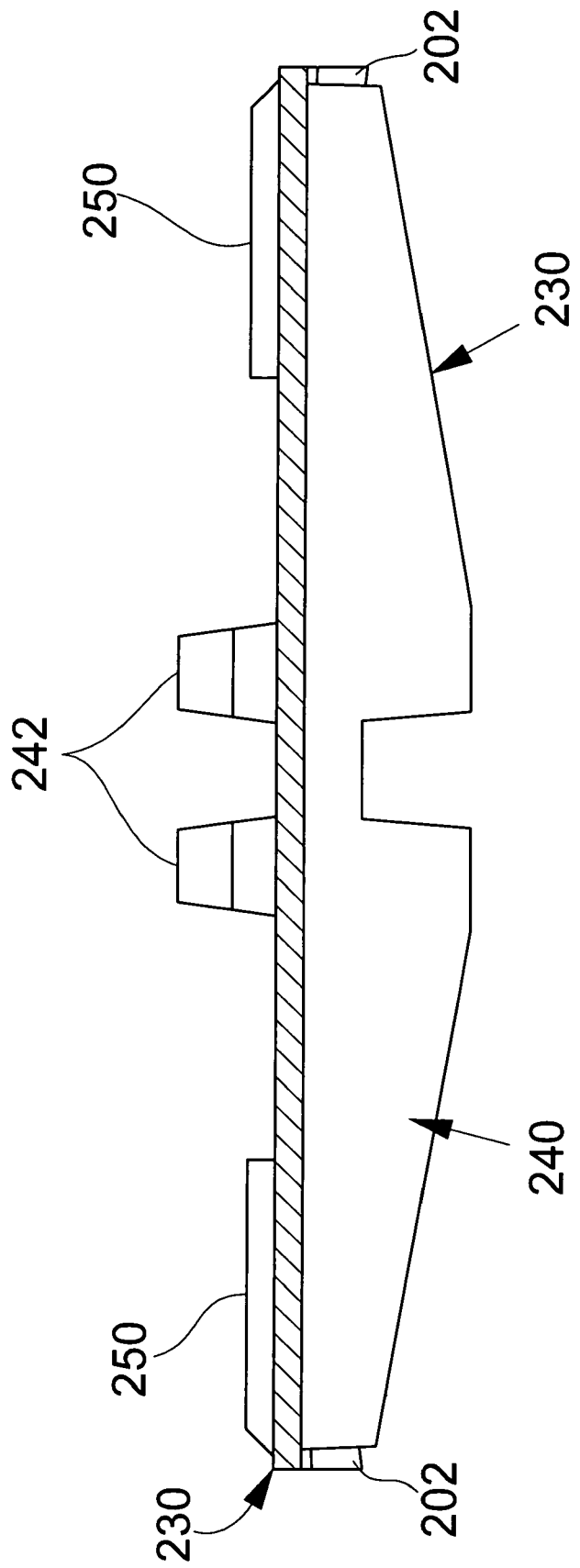
FIG. 22 shows an end view to the pleated track section of FIG. 20 taken forward of the steering lugs.
Figure 23:
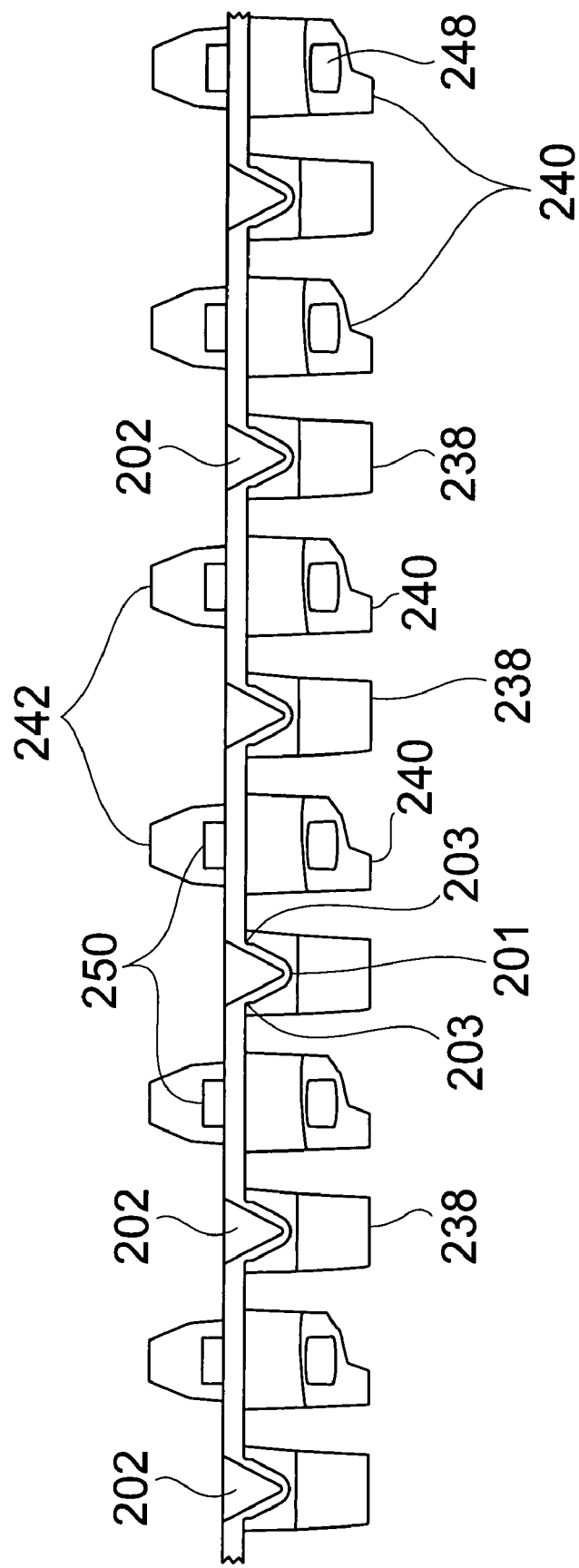
FIG. 23 shows a side plan view to the pleated track section of FIG. 20.

Details to the particular construction of the improved track 230 are shown at FIGS. 20 through 25 wherein respective perspective, top, side and end views of the track 230 are shown. FIG. 20 depicts a sectional perspective view of the interior surface of the track 12 and several seriatim pleats 202 and adjacent surfaces 231. Each pleat 202 rises and extends to an adjoining peripheral track edge at an acute angle in the range of 5 to 20 degrees and projects approximately ½ to 1 inch from the bottom of the track 230 at its maximum height. The wall thickness (e.g. ⅛ to 3/16 inch) and construction of each pleat 202 is sized and formed to promote flexion as the wheels 222 contact the lugs 242 and direct the track 230 left and right. The pleats 202, in turn, expand and contract as they move over the beveled or ramped surfaces of the support pan 204. As the wheels 222 move laterally and run against the drive lugs 242, the pleats 202 engage the beveled surfaces of the support pan 204, flatten and expand or relax and contract in relation to the degree of contact with the support pan 204.

Each pleat 202 rises to a ridged apex 201 or hinge where each pleat 202 expands and contracts as the wheels 222 slide laterally and direct the pleats 202 relative to the contours of the support pan 204 to flex and expand or relax and contract. Relief channels 233 are formed into the interconnecting junctions of the sidewall webs of each pleat 202 with the bottom surface of the track 12 to similarly promote flexion of the pleats 202. Flexion of the pleats 202 can also be enhanced by providing apertures or recesses 251 (shown in dashed line) in the track 230 at the apex of the V of each pleat 202. The size and shape of the apertures 251 can be established as desired. The apertures 251 also exhaust snow from the interior of the track 230 that collects above the tray 225. The foregoing details can be seen along with the relative locations of the pleats 202, ground gripping lugs 238 and 240, and drive lugs 242 and related improvements thereto at FIGS. 21 through 26

Although V-shaped pleats 202 are shown, other raised or flexible shaped track surfaces can be incorporated into the track 230. The pleats 202 or other flexible members can be transversely aligned to extend at any desired angular orientation to a longitudinal center axis of the track 230, although presently extend at an acute angle or orthogonal to the longitudinal track axis. The flexible surfaces can be located along the peripheral edges or can be located so they are circumscribed by adjoining portions of the track to cooperate with mating chassis surfaces or assemblies supported to the chassis 4. The flexible surfaces desirably should direct the flexible portions of the track 230 to expand and contract at opposing regions to promote steering changes.

Figure 24:
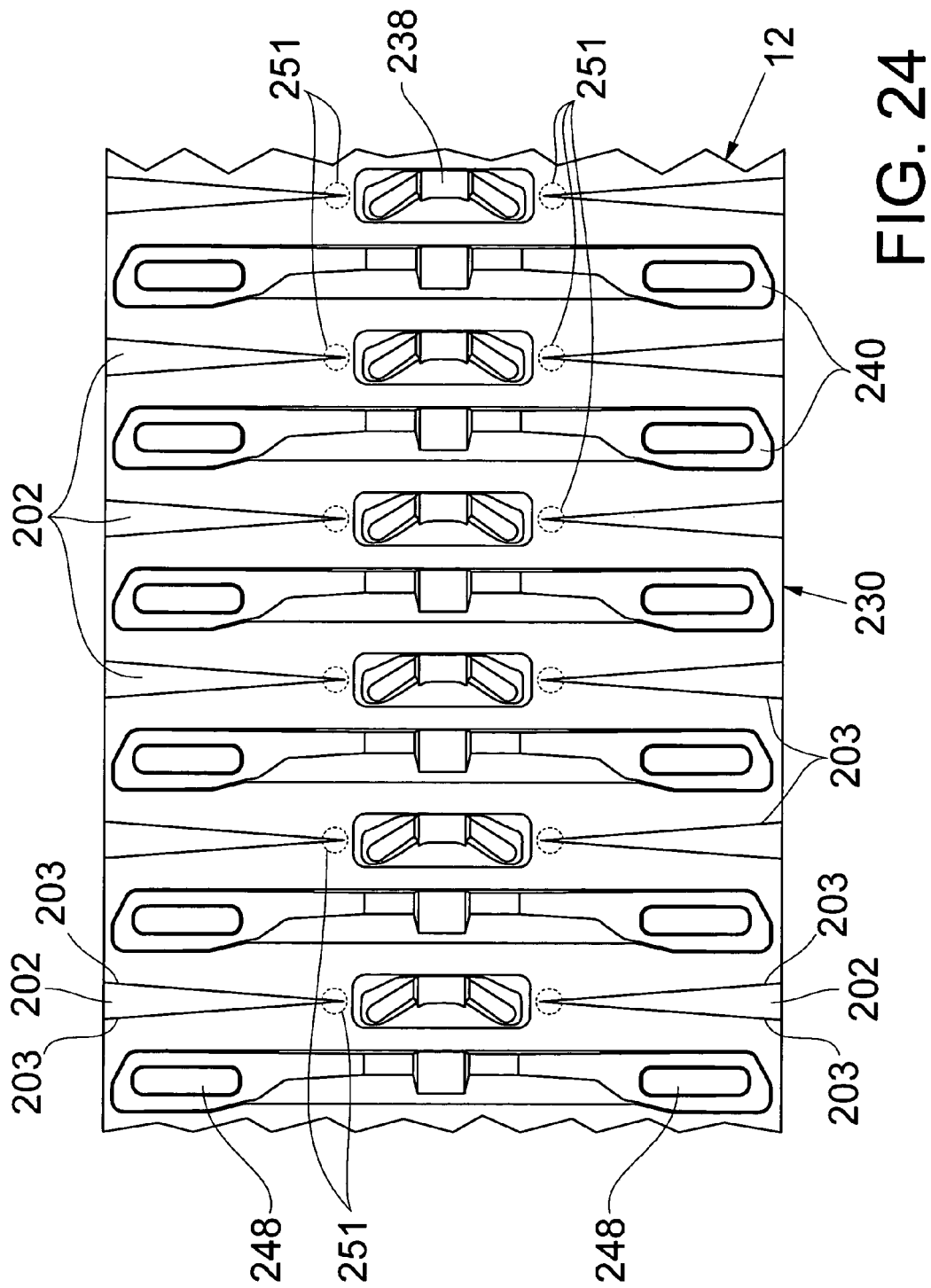
FIG. 24 shows a bottom plan view to the pleated track section of FIG. 20.
Figure 25:
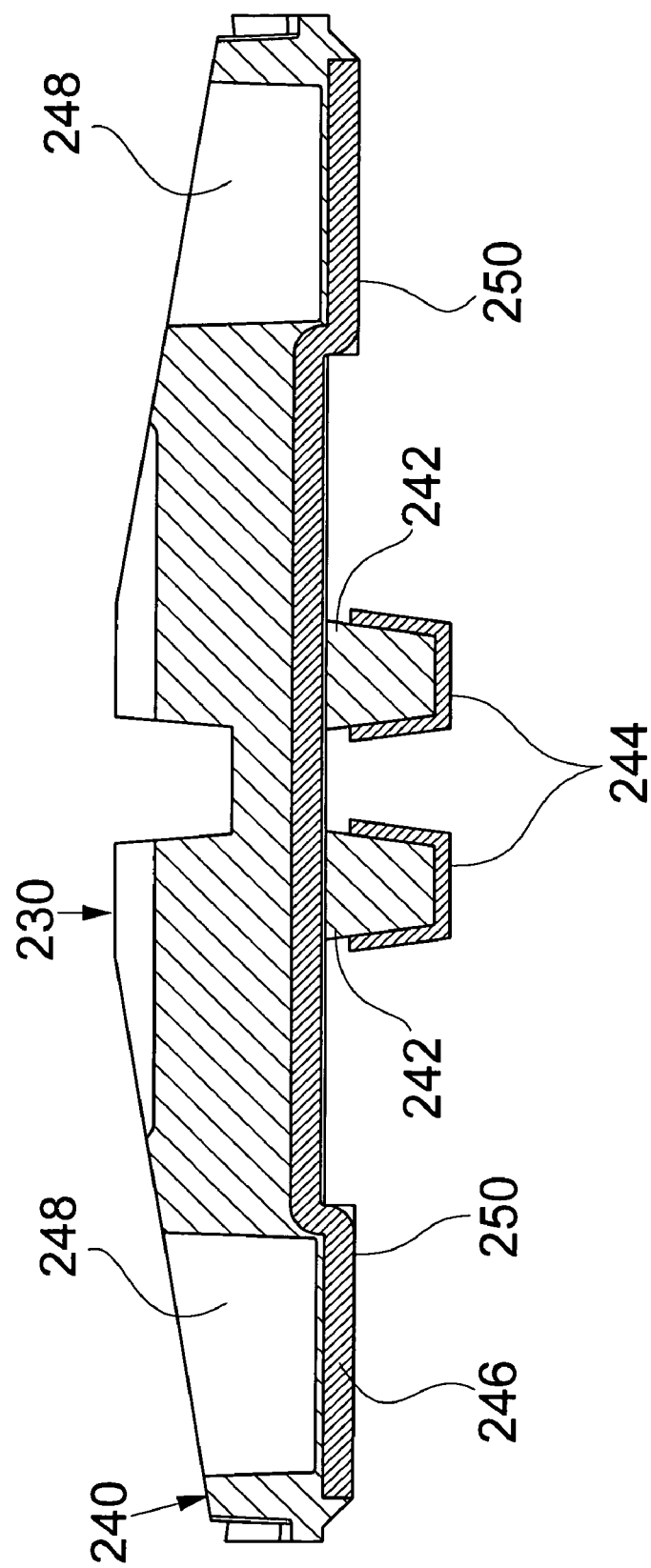
FIG. 25 shows a cross section view to the pleated track taken through the steering lugs and along section lines 25-25 of FIG. 21 and wherein the drive lugs contain UHMW caps.
Figure 26:
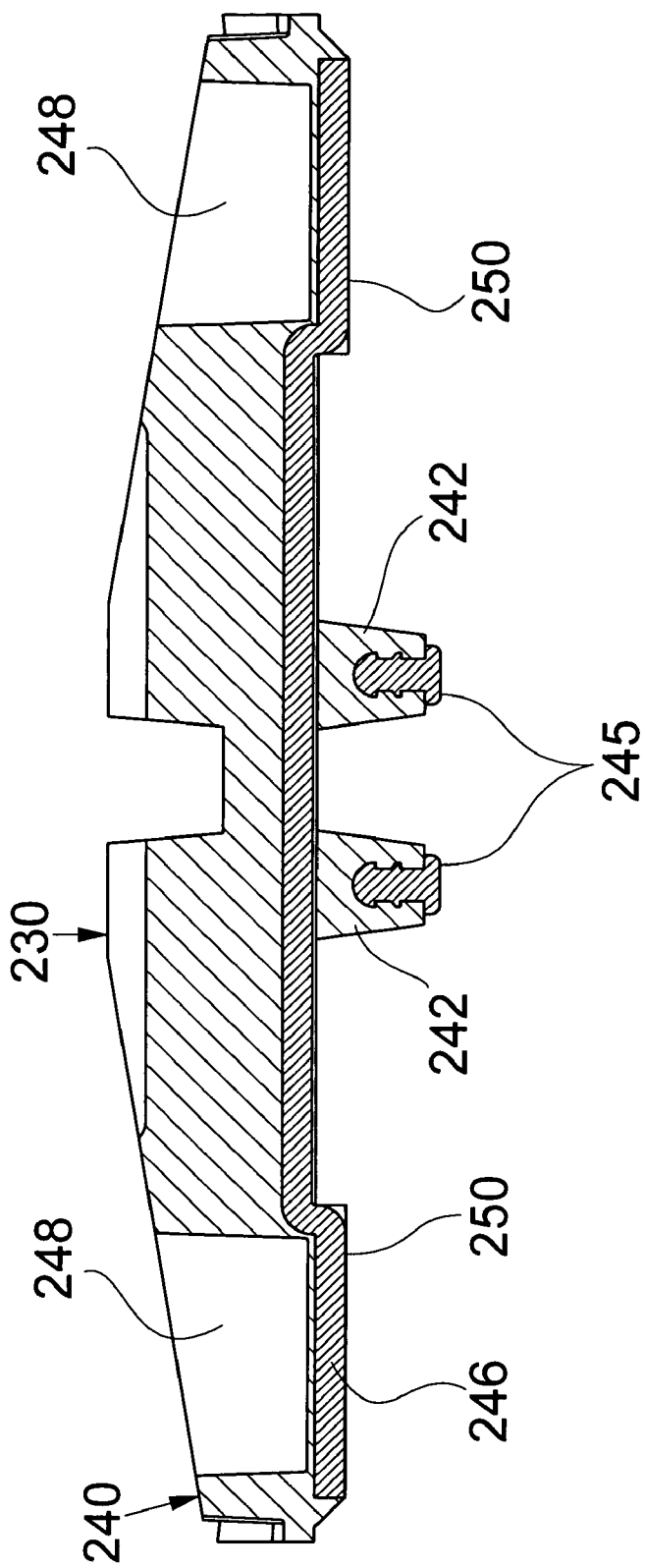
FIG. 26 shows a cross section view similar to the FIG. 25 and wherein the drive lugs contain UHMW plugs molded into the drive lugs.

With attention to FIGS. 24 through 26 additional details are shown to improvements to the lugs of the track 230. Projecting from the bottom, ground engaging surface of the track 230 and coaxially aligned with the pleats 202 are a series of centered, ground gripping lugs 238. Longitudinally offset from the lugs 238 and depending opposite the raised surfaces 250 are elongated steering lugs 240 that span the width of the track 230. The lugs 240 include recessed cavities 248 designed and located to enhance the gripping characteristics of the track 230. The shapes and locations of the cavities 248 can be varied as desired. The present cavities 248 overly the raised surfaces 250 at the track interior and the thermo formed track stiffeners 246 that are molded into the track 230.

As the cavities 248 are formed in a track mold, UHMW stiffener members 246 previously supported in the mold and/or to the track blank are contemporaneously bonded to the track 12 and formed to a shape to enhance track cooperation with the support pan 204. The members 246 are particularly mounted to a partially formed track blank that is wrapped and wound with suitable belting, cording etc. The stiffener members 246 are located to align with cavities in a track mold and presently span the track blank to collinearly align the stiffener members 246 to the ultimately formed steering lugs 240. With several iterative engagements of the mold at a suitable pressure and temperature, the rubber and UHMW material at the track blank flow and/or bend to mold the track 230 to the depicted shape.

The drive lugs 242 are coaxially aligned with raised surfaces 250 and stiffeners 246 that engage the support pan 204. The raised surfaces 250 are described in detail below but contain thermo formed UHMW track stiffener members 246 that are located to reduce the friction between the track 230 and the support pan 204.

As the track blank is molded, portions of the mold are depressed into the steering lugs 240 to form the cavities 248 in the ends of the lugs 240. The heated stiffener members 246 are contemporaneously depressed and bent to define raised surfaces 250. The depressed cavities 248 thus improve traction at the exterior ground gripping track surface and reduce friction at interior raised surfaces 250 which slide over the support pan 204 with reduced friction. The track wear and durability is thereby improved.

During construction of the track 230, caps 244 constructed of UHMW plastic or other high density material exhibiting relatively low friction relative to the support pan 204 can be positioned in the mold to align with the portions molded to define the drive lugs 242. The caps 244 can also be separately fastened or bonded to the lugs 242 after molding, before or after the track 230 has cooled. As the track material flows, the raised drive lugs 242 are formed and the caps 244 are thermally bonded to the drive lugs 242. Alternatively, the caps 230 and 244 can be pressed or threaded into reduced size cavities. The capped drive lugs 242 provide enhanced track durability and reduced friction and wear with the sprocket 54 and between the track 230 and support pan 204. Alternatively, UHMW plugs 245 shown at 26 can be bonded, thermo formed or fitted to the lugs 242 during or after the molding of the track 230.

Figure 27:
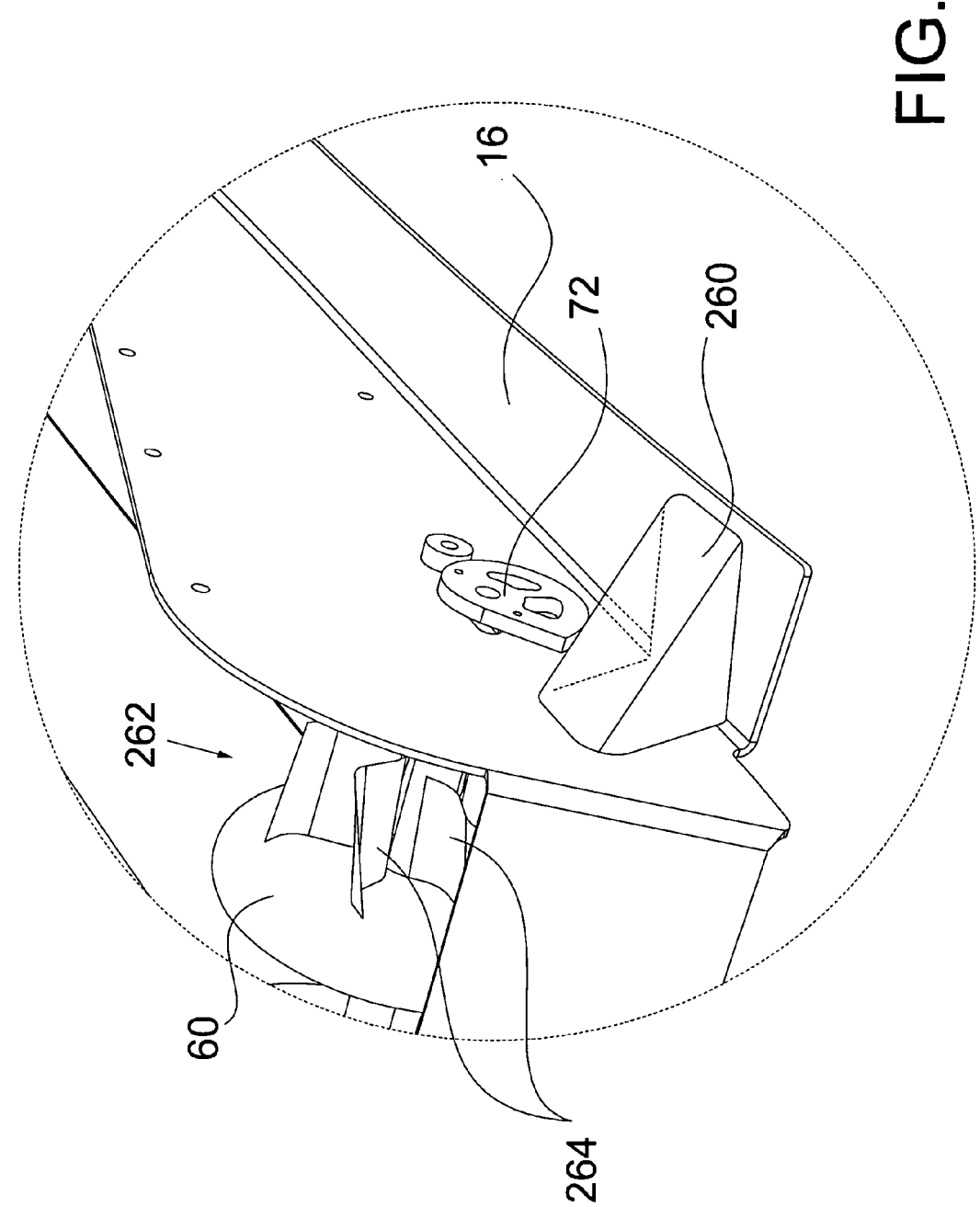
FIG. 27 shows a section view taken from the area of the encircled section line F27 of FIG. 1 to a multi-vane snow and ice agitator assembly mounted to the track guide wheels and cooperating with an adjoining exhaust chute.

FIGS. 15 and 16 also depict an upper track support pan or snow deflection or diverter pan 225 that can be made of metal or plastic that cooperates with the track support pan 204 to control or minimize the collection of snow and/or ice between the interior surface of the track 12 and the upper pan 225 and in the spaces surrounding the apertures 215 and 232. Any snow entering the apertures 215 and 232 collects above the pan 225 and is directed forward from an elevated aft flange 227 due to the rotating action of the drive lugs 242 and raised surfaces 250 along the pan 225. The snow is directed to a discharge or exhaust port 260 shown at FIG. 27 where the snow is ejected. The snow is also ejected through the apertures 251 in the track 230. The reduction in snow and ice buildup is also discussed below with respect to an improved upper, molded plastic diverter or track support pan 280 shown at FIGS. 30 to 33 below FIG. 27 depicts a section view to a further improvement to the chassis assembly 4 taken at the encircled section line F27 of FIG. 1. A snow and ice agitator assembly 262 is particularly shown that mounts either to the idler wheels 60 or adjacent to the wheels 60 along the idler axle 61. Agitator vanes 264 are mounted to rotate and contact snow inside the chassis 4 or that is diverted via the shield 225 to beat and break up any ice particles. The pulverized material is directed to the exhaust chute 260.

Presently, several vanes or agitators 264 are mounted to the rims of the idler wheels 60. The vanes 264 are located and shaped to breakup ice and crusted snow and direct the debris into the discharge port or exhaust chute 260 and away from the chassis 4. The exhaust chute 260 is sized and shaped to prevent clogging and direct the debris away and without hindering operation of the snowboard 2.

Although one construction and mounting of an agitator assembly 262 is shown, the agitators 264 can be constructed to different shapes and/or be located elsewhere relative to the support pan 204 and track 230 to promote steering (e.g. the drive sprocket 54). The agitators 264 can also include apertures at the vanes 264 and/or the edges can be shaped differently and/or include other surface shapes conducive to optimizing the breakup of encountered chunks of crusted snow and ice before the pulverized debris is exhausted.

Figure 28:
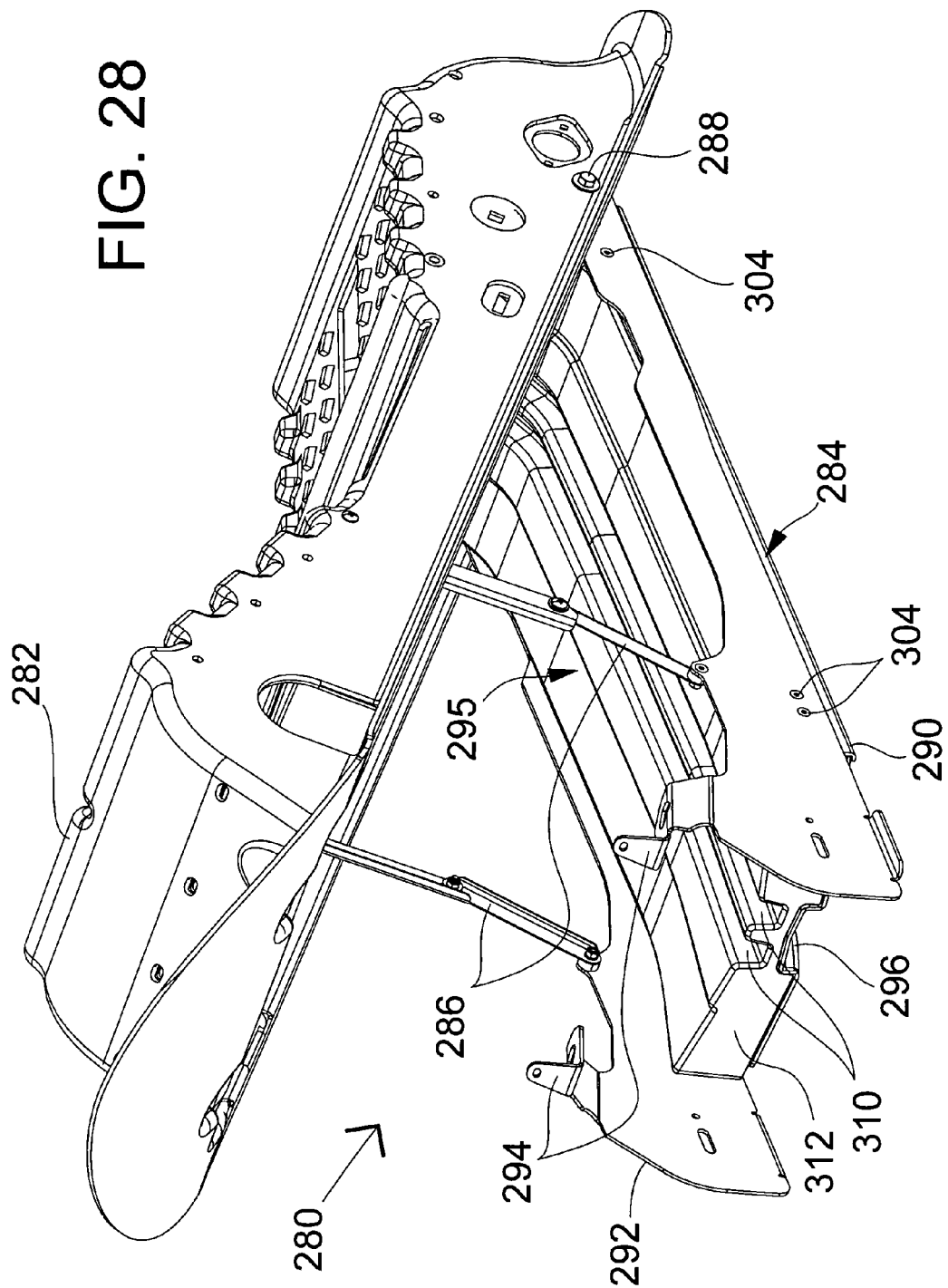
FIG. 28 shows a perspective view to the top front and left side of an improved personal, engine powered snowboard assembly wherein the chassis cover piece is hinged open to expose the track support/slide pan assembly.
Figure 29:
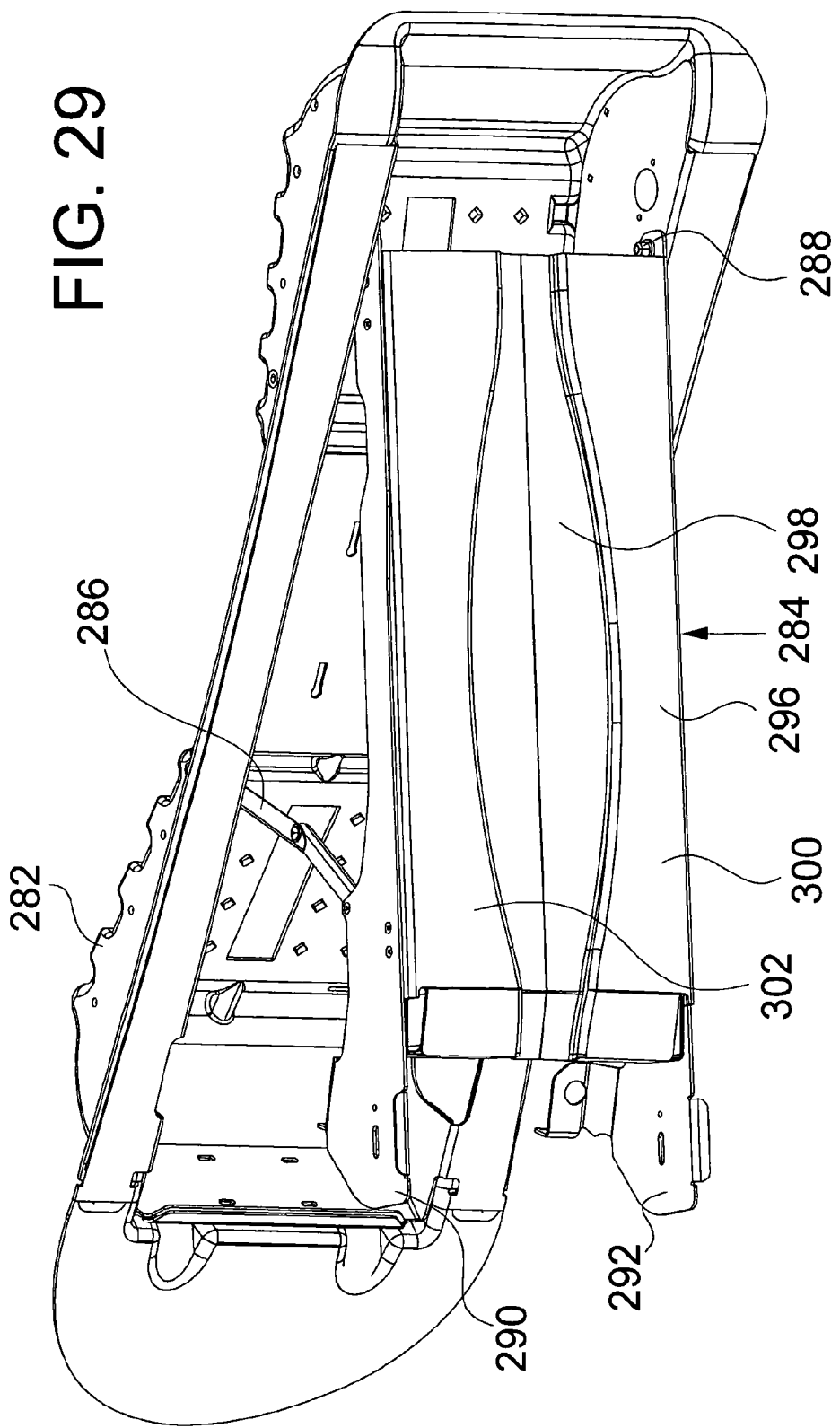
FIG. 29 shows a perspective view to the bottom, left side and rear portions of the snowboard assembly of FIG. 28 and wherein the chassis cover piece is hinged open and the bottom surface of the lower track support pan is exposed.
Figure 30:
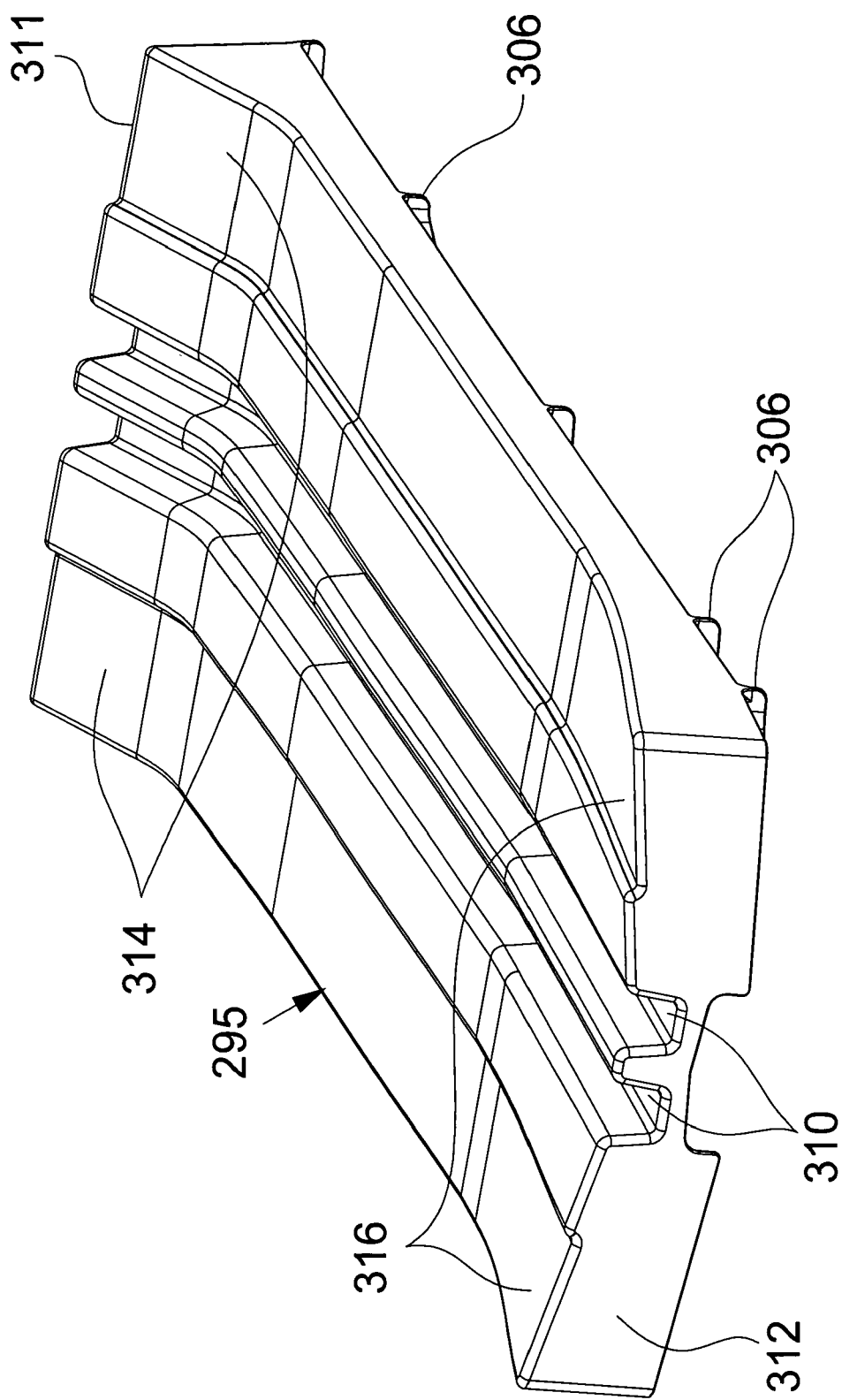
FIG. 30 shows a perspective view to the upper, plastic track support pan or diverter and the compound curvatures formed into the right and left corners at the fore and aft ends.
Figure 31:
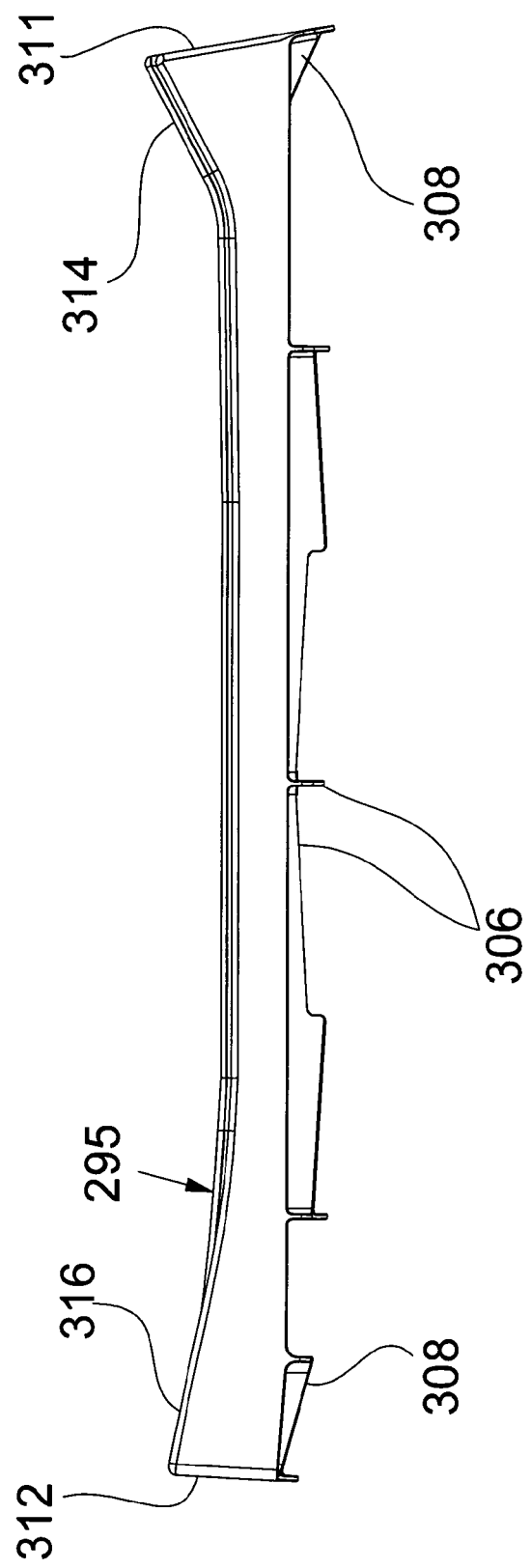
FIG. 31 shows a longitudinal, left side view of the upper, plastic track support pan.
Figure 32:
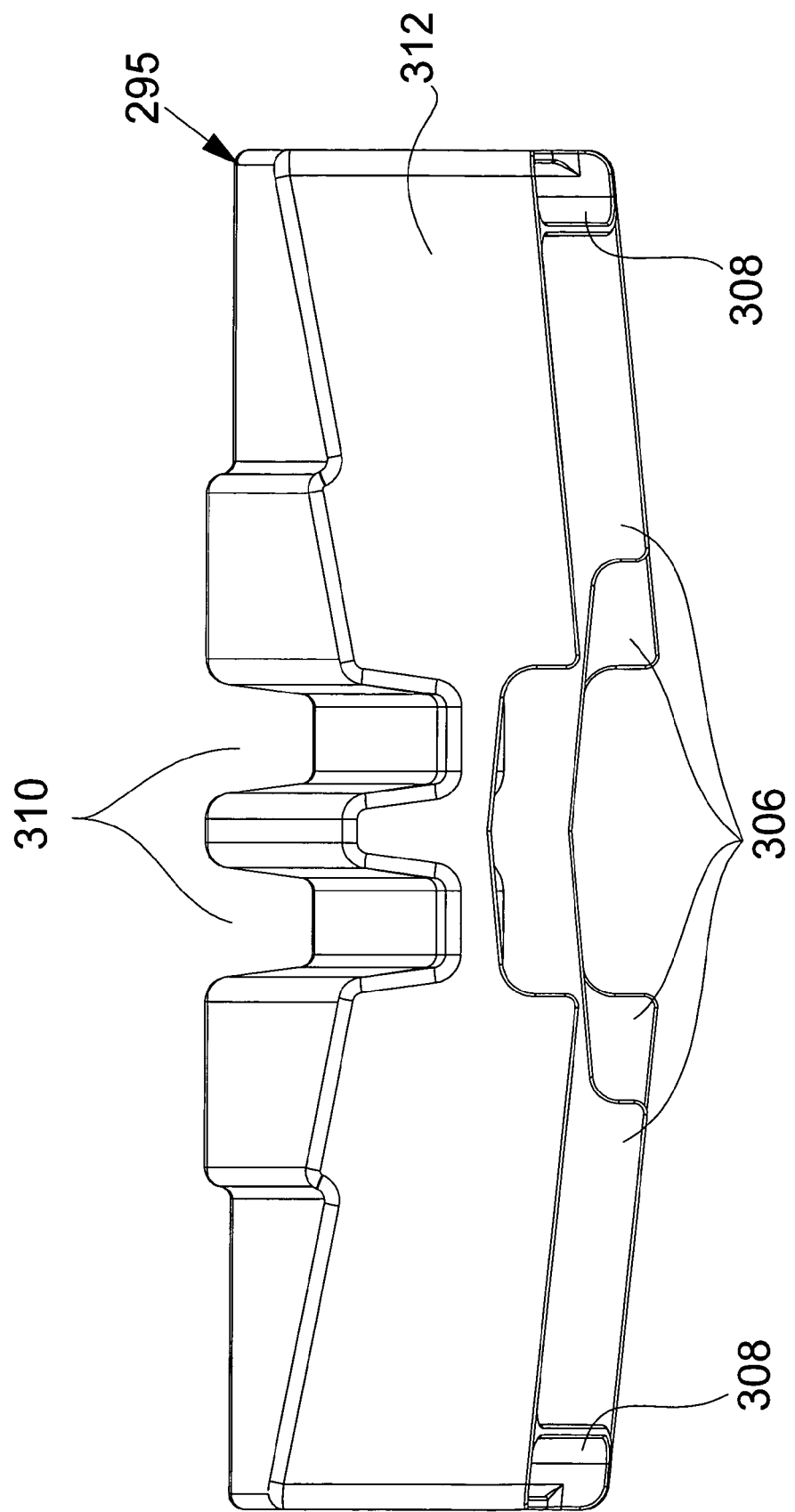
FIG. 32 shows a front view of the upper, plastic track support pan.
Figure 33:
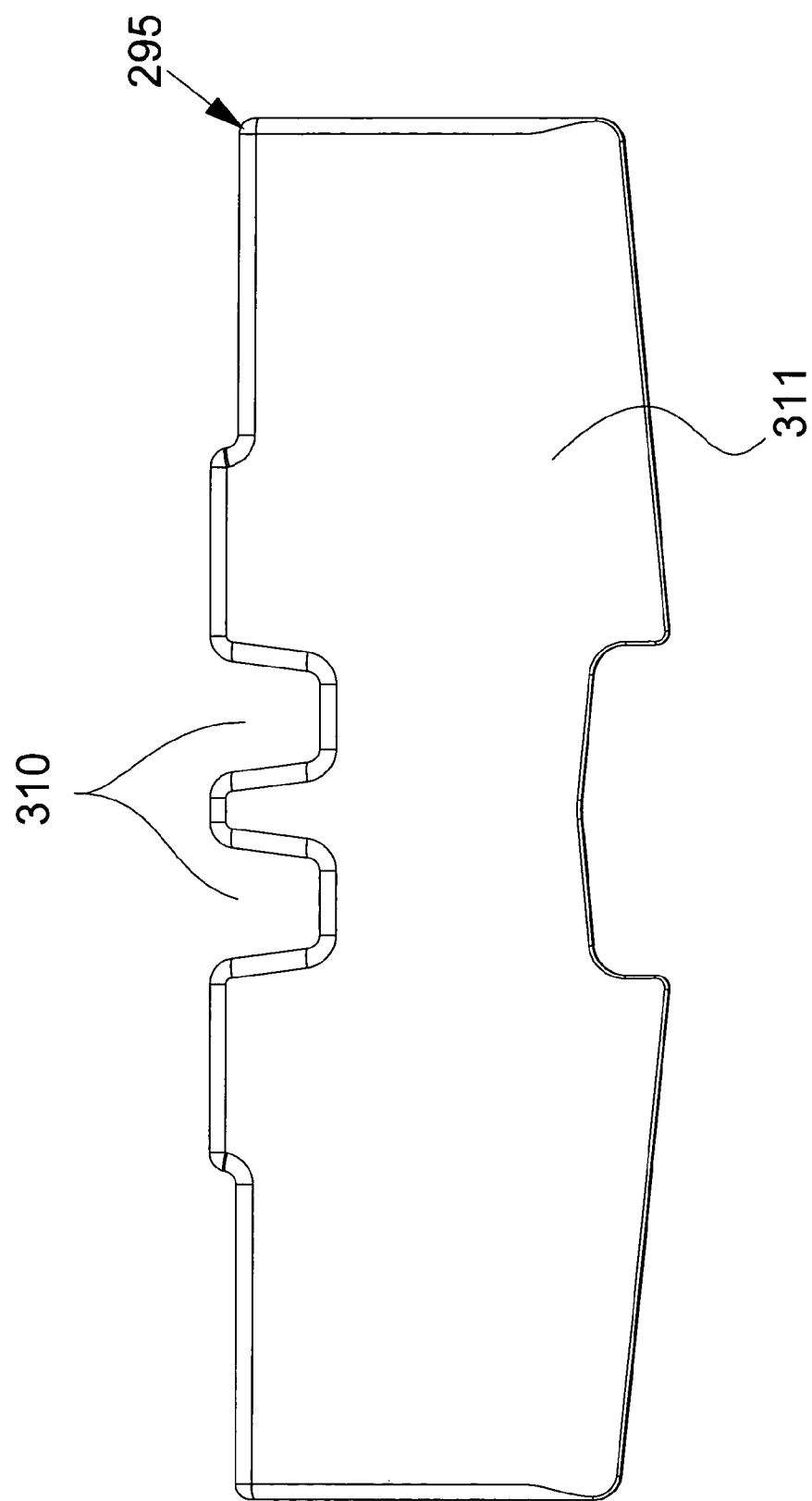
FIG. 33 shows a rear view of the upper, plastic track support pan.

FIGS. 28 through 33 disclose additional improvements to the snowboard 2. FIGS. 28 and 29 particularly depict a snowboard 280 with a hinged chassis cover piece 282. The chassis cover piece 282 is coupled to a track support pan assembly 284 at right and left forward, locking hinge arms 286 and right and left rear pivot fasteners 288. The hinge arms 286 permit the chassis cover piece 282 to be selectively elevated to access the track 12 (not shown) and to remove any ice and snow that might collect in the space between the cover piece 282 and track 12. The hinge arms 286 include an over-center latching action that a lock when the cover 282 is sufficiently elevated. The arms 286 are released upon raising the cover 282 and folding the hinges 286 forward to permit the cover 282 to be fully lowered. A variety of other hinge assemblies can be used to advantageously expose the track 12 and track support pan assembly 284 to cleaning and maintenance.

Longitudinal rails 290 and 292 extend along the sides of the track support assembly 284 and provide bent latch pieces 294 that project through the cover piece 282. Lynch pins or other suitable fasteners (now shown) mount to apertures at the latch pieces 294 to contain the chassis cover 282 during normal use.

Fitted between the side rails 290 and 292 are a refined upper diverter pan 295 and an improved lower track support pan 296. The lower support pan 296 is formed to provide a longitudinal, concave ovular channel 298. The channel 298 is formed to exhibit compound longitudinal and transverse concave curvatures relative the ground. Adjoining peripheral pan edge surfaces 300 and 302 exhibit convex bevels relative to the ground such that the edge surfaces 300 and 302 rise from the channel as they extend to the rails 290 and 292. The upper diverter pand 295 mounts over the lower pand 296 and fasteners 304 secure the rails 290 and 292 to the overlapping upper pans 295 and 296. The compound convex and concave curvatures of the lower support pan 296 facilitate vehicle steering as the pleats 202 engage the perimeter pan edges 300 and 302 and the channel 298 contains the drive lugs 242.

FIGS. 30 through 33 depict the improved plastic diverter pan 295. The pan 295 is molded from plastic and includes a number of interconnected center truss pieces 306 and end truss pieces 308. The truss pieces 306 and 308 span between the side and end walls of the pan 280 to stabilize the pan 295 against the normal movement of the track 12 over the pan 295. Longitudinal channels 310 contain the drive lugs 242. The plastic material is selected to accommodate the normal stress forces, operating temperatures and exhibit a slippery surface to the lugs 242, snow and ice.

As discussed above, movement of the track 12 over the upper surface of the pan 280 desirably directs snow and ice outward and away from the pan 295. The aft end 311 is elevated to deflect snow from the track 12 as the track 12 rotates forward. The fore end 312 is lowered to deflect snow from the track 12 as the track 12 rotates over the forward end. The upper surface of the pan 295 and particularly the end corner surfaces 314 and 316 exhibit diagonal, compound upward tapers to prevent the buildup of ice and to direct snow and ice outward and away from the space between the pan assembly 284 and the overlying track 12. Although one construction of the upper pan 295 is shown, the pan 295 can be constructed from a variety of materials and exhibit a variety of shapes and structural supports. The upper surface contours can also be modified to further enhance the self-clearing of snow and ice the normal track rotation.

While the invention has been described with respect to a presently preferred assembly and considered improvements, modifications and/or alternatives thereto, still other assemblies and arrangements may be suggested to those skilled in the art. It is also to be appreciated that the features of the foregoing chassis, frame and track can be arranged in different combinations. For example, the track might be included with a different chassis configuration; the bottom contour of the support pan may be configured differently; a different track drive assembly may be coupled to the track; and/or the drive and/or ground contact lugs at the track and/or the slots between flexible filamentary members or the pleats can be configured differently. The diverter pan and/or the agitator can also be used with other snow vehicles or provided in different snowboard combinations. The foregoing description should therefore be construed to include all those embodiments within the spirit and scope of the following claims.

The invention claimed is:

1. A motorized vehicle comprising:
 a) a chassis supporting an engine, a track and an operator platform;
 b) a framework mounted to said chassis having a chassis cover piece mounted to pivot relative to said framework and including a drive sprocket coupled to said engine and a plurality of idler wheels and wherein said track is trained around said sprocket and idler wheels; and
 c) wherein said track includes a drive portion and a flexible portion, wherein said flexible portion comprises a plurality of flexible track pieces mounted to contact a contoured substantially rigid bottom surface of said chassis to resiliently expand and contract away from and toward adjoining track pieces in response to weight shifting movements of an operator at said operator platform to vary the gripping action of said track with the ground to steer said vehicle.

2. A vehicle as set forth in claim 1 wherein said flexible track pieces comprise a plurality of fringe pieces separated by intervening gaps adjacent a lateral side of said drive portion, wherein drive lugs project from an interior surface of said drive portion to engage said drive sprocket, and wherein a plurality of ground engaging lugs depend from external surfaces of said drive portion and fringe pieces.

3. A vehicle as set forth in claim 1 wherein said flexible portion comprises a plurality of pleats that transversely extend from said drive portion to expand and contract upon contact with the contoured bottom surface.

4. A vehicle as set forth in claim 3 wherein said pleats comprise compound raised V-shaped ridges that transversely extend from an apex at said drive portion and progressively and laterally expand as they extend to the peripheral edges of said track.

5. A vehicle as set forth in claim 4 wherein said pleats extend orthogonal to a longitudinal center axis of said track and wherein said track includes an aperture at the apex of each pleat.

6. A vehicle as set forth in claim 3 wherein the contoured bottom surface of said chassis exhibits a transversely beveled surface relative to the ground that engages and flexes the pleats with operator movement.

7. A vehicle as set forth in claim 3 wherein the contoured bottom surface of said chassis exhibits a longitudinal recess wherein drive lugs of said track are restrained and wherein the recess extends between first and second convex surfaces that extend from said recess to peripheral edges of said chassis and that engage the pleats to flex the pleats with operator movement.

8. A vehicle as set forth in claim 7 wherein said recess includes longitudinal, arcuate side wall surfaces.

9. A vehicle as set forth in claim 1 wherein the contoured bottom surface of said chassis comprises a recess that longitudinally extends between left and right beveled bottom surfaces that transversely extend to peripheral edges of said chassis.

10. A vehicle as set forth in claim 3 wherein said flexible portion comprise first and second pleated portions that respectively extend from opposite sides of said drive portion and wherein ground engaging lugs substantially span the width of and depend from said track fore and aft of each pair of said pleats.

11. A vehicle as set forth in claim 10 wherein said ground engaging lugs include recessed cavities.

12. A vehicle as set forth in claim 11 wherein said track includes a plurality of stiffener members mounted to transversely span said track, wherein a stiffener member coaxially overlies each ground engaging lug, wherein each stiffener exhibits a bent portion overlying each recessed cavity, and wherein the bent portions of said stiffeners are defined at raised interior surfaces of said track.

13. A vehicle as set forth in claim 1 wherein said chassis includes first and second operator foot rest platforms and a rigid stanchion that supports vehicle controls.

14. A vehicle as set forth in claim 1 wherein said track includes a plurality of drive lugs that engage said sprocket and wherein a UHMW material is provided at each drive lug in the region of contact with said sprocket.

15. A vehicle as set forth in claim 1 wherein said framework includes a diverter member mounted to direct snow and ice collecting within interior spaces of the framework away from the vehicle.

16. A vehicle as set forth in claim 15 wherein said diverter member comprises an upper pan that overlies a lower pan that includes the contoured bottom surfaces and wherein surfaces of said upper pan are contoured to direct snow and ice outward from a space between the upper pan and said track.

17. A vehicle as set forth in claim 1 wherein said hinge member is selectively operable to latch said cover piece in open and covering conditions to said framework.

18. A vehicle as set forth in claim 1 wherein said framework comprises an upper pan that overlies a lower pan that includes the contoured bottom surface and wherein corner surfaces of said upper pan are contoured to direct snow and ice outward from a space between the upper pan and said track.

19. A vehicle as set forth in claim 1 wherein said flexible track pieces comprise a plurality of fringe pieces separated by intervening gaps that extend from a lateral side of said drive portion, wherein drive lugs project from an interior surface of said drive portion to engage said drive sprocket, wherein a plurality of ground engaging lugs transversely span and depend from external surfaces of said drive portion and fringe pieces.

20. A motorized vehicle comprising:
 a) a chassis comprising an operator platform and an upper pan that overlies a lower pan that includes a contoured bottom surface, an engine, a drive sprocket coupled to said engine, and a track and wherein surfaces of said upper pan are contoured to direct snow and ice outward from a space between the upper pan and said track;

b) wherein said track includes a drive portion having a plurality of drive lugs coupled to said drive sprocket to rotate and direct vehicle motion; and b) wherein said track includes a flexible portion comprising a plurality of flexible track pieces that transversely extend from said drive portion and are mounted to contact the contoured bottom surface of said chassis to resiliently expand and contract away from and toward adjoining flexible track pieces in response to weight shifting movements of an operator at said operator support to vary the gripping action of said track to the ground to steer said vehicle.

21. A motorized vehicle as set forth in claim 20 wherein said flexible track pieces comprise a plurality of pleats that transversely extend to opposite lateral peripheral edges of said track.

22. A motorized vehicle comprising:
   a) a chassis having an operator platform, a chassis cover piece mounted to pivot relative to said framework, a contoured bottom surface, an engine and a track including a plurality of drive lugs and a plurality of ground engaging lugs;
   b) wherein said track is trained about a drive sprocket coupled to said engine and a plurality of rotationally mounted idler members coupled to said chassis to rotate in endless fashion and such that said drive lugs engage said drive sprocket to rotate said ground engaging lugs to direct vehicle motion; and
   c) wherein said track includes a flexible portion comprising a plurality of flexible pieces, and wherein said flexible pieces are mounted to contact said contoured bottom surface and flex with operator movements at said platform to vary a gripping action of said ground engaging lugs with the ground to steer said vehicle.

23. A vehicle as set forth in claim 22 wherein said drive lugs project from an interior surface of a drive portion of said track and wherein said flexible portions comprise a plurality of pleats that transversely extend from opposite lateral sides of the drive portion, wherein said ground engaging lugs project from exterior surfaces of said pleats, wherein the bottom surface of said chassis includes beveled surfaces that engage the pleats to resiliently expand and contract the pleats in response to weight shifting movements of an operator.

24. A motorized vehicle comprising:
   a) a chassis supporting an engine, a track and an operator platform;
   b) a framework mounted to said chassis and including a drive sprocket coupled to said engine and a plurality of idler wheels and wherein said track is trained around said sprocket and idler wheels; and
   c) wherein said track includes a drive portion and a flexible portion, wherein said track includes members formed of UHMW materials mounted to drive lugs that engage said sprocket and/or ground engaging lugs, wherein said flexible portion comprises a plurality of flexible track pieces mounted to contact a contoured substantially rigid bottom surface of said chassis to resiliently expand and contract away from and toward adjoining track pieces in response to weight shifting movements of an operator at said operator platform to vary the gripping action of said track with the ground to steer said vehicle.

\* \* \* \* \*